United States Patent
Kudo et al.

(10) Patent No.: US 9,457,837 B2
(45) Date of Patent: Oct. 4, 2016

(54) STEERING DEVICE, STEERING CONTROL DEVICE, AND STEERING CONTROL METHOD

(71) Applicants: Yoshio Kudo, Machida (JP); Yoshiaki Suzuki, Shizuoka-ken (JP); Motoaki Kataoka, Kariya (JP); Daiji Watanabe, Nagoya (JP); Hisaya Akatsuka, Aichi-ken (JP)

(72) Inventors: Yoshio Kudo, Machida (JP); Yoshiaki Suzuki, Shizuoka-ken (JP); Motoaki Kataoka, Kariya (JP); Daiji Watanabe, Nagoya (JP); Hisaya Akatsuka, Aichi-ken (JP)

(73) Assignees: TOYOTA JIDOSHA KABUSHIKI KAISHA, Aichi-ken (JP); DENSO CORPORATION, Aichi-ken (JP)

( * ) Notice: Subject to any disclaimer, the term of this patent is extended or adjusted under 35 U.S.C. 154(b) by 0 days.

(21) Appl. No.: 14/405,341

(22) PCT Filed: Jul. 16, 2013

(86) PCT No.: PCT/IB2013/001528
§ 371 (c)(1),
(2) Date: Dec. 3, 2014

(87) PCT Pub. No.: WO2014/020391
PCT Pub. Date: Feb. 6, 2014

(65) Prior Publication Data
US 2015/0120140 A1    Apr. 30, 2015

(30) Foreign Application Priority Data
Aug. 3, 2012 (JP) ................................ 2012-172587

(51) Int. Cl.
*B62D 5/04*    (2006.01)
*B62D 6/00*    (2006.01)

(52) U.S. Cl.
CPC ............. *B62D 5/0472* (2013.01); *B62D 6/008* (2013.01)

(58) Field of Classification Search
CPC ............................. B62D 5/0472; B62D 6/008
USPC ........................................................... 701/41
See application file for complete search history.

(56) References Cited

U.S. PATENT DOCUMENTS

| | | | |
|---|---|---|---|
| 2007/0168094 A1 | 7/2007 | Nishiyama | |
| 2008/0066991 A1* | 3/2008 | Kataoka | B62D 5/046 180/443 |
| 2008/0243329 A1* | 10/2008 | Hamel | B62D 5/0472 701/31.4 |
| 2011/0153162 A1* | 6/2011 | Kezobo | B62D 5/0463 701/42 |

(Continued)

FOREIGN PATENT DOCUMENTS

| | | |
|---|---|---|
| DE | 102008021856 A1 | 11/2009 |
| EP | 1 975 040 A1 | 10/2008 |
| JP | 10-16809 A | 1/1998 |
| JP | 2000-198455 A | 7/2000 |

(Continued)

*Primary Examiner* — Brian P Sweeney
(74) *Attorney, Agent, or Firm* — Sughrue Mion, PLLC

(57) ABSTRACT

A steering device (1) includes: a steering member (4) that is provided in a vehicle (2) and configured to be rotationally operated; an actuator (8) that generates a torque assisting a steering operation on the steering member (4); a detection device (9) that detects a torque applied to a steering shaft portion (5) that rotates together with the steering member (4); and a steering control device (11) that performs vibration suppression control to suppress vibrations transmitted to the steering member (4) by adjusting a torque generated by the actuator (8), on a basis of a detected torque that is a torque detected by the detection device (9). The steering control device (11) controls the actuator (8) such that a torque of a frequency band in a first predetermined range, which corresponds to the detected torque is not suppressed.

19 Claims, 19 Drawing Sheets

(56) References Cited

U.S. PATENT DOCUMENTS

| | | |
|---|---|---|
| 2012/0175183 A1 | 7/2012 | Sakaguchi |
| 2013/0073146 A1* | 3/2013 | Konomi ............... B62D 5/0472 701/41 |
| 2013/0179037 A1 | 7/2013 | Ebihara et al. |
| 2014/0058630 A1* | 2/2014 | Kezobo ................ B62D 5/0463 701/42 |
| 2015/0088381 A1* | 3/2015 | Imamura .............. B62D 5/0472 701/41 |

FOREIGN PATENT DOCUMENTS

| | | |
|---|---|---|
| JP | 2005-219539 A | 8/2005 |
| JP | 2007-84006 A | 4/2007 |
| JP | 2007-186064 A | 7/2007 |
| JP | 2010-036846 A | 2/2010 |
| JP | 2010-163109 A | 7/2010 |
| JP | 2010202048 A | 9/2010 |
| JP | 2012-062028 A | 3/2012 |
| WO | 2011037019 A1 | 3/2011 |

\* cited by examiner

STEERING DEVICE, STEERING CONTROL DEVICE, AND STEERING CONTROL METHOD

BACKGROUND OF THE INVENTION

1. Field of the Invention

The invention relates to a steering device, a steering control device, and a steering control method.

2. Description of Related Art

As a conventional steering device and a conventional steering control device that are mounted on a vehicle, a vehicular power steering device that includes assist force imparting means for imparting an assist force for a steering force is described in, for example, Japanese Patent Application Publication No. 2005-219539 (JP-2005-219539 A). If it is determined that a predetermined frequency component of a first force applied to a front-left wheel and a predetermined frequency component of a second force applied to a front-right wheel satisfy a resonance condition set in advance, the vehicular power steering device outputs, in accordance with the resonance state, a cancel signal for canceling the resonance state to the assist force imparting means for imparting the assist force for the steering force.

Meanwhile, the vehicular power steering device described in the aforementioned Japanese Patent Application Publication No. 2005-219539 (JP-2005-219539 A) detects a flutter (vibrations), which occurs in a steering system, and suppresses the flutter through the foregoing configuration. However, there is room for further improvement in, for example, driving feeling.

SUMMARY OF THE INVENTION

The invention provides a steering device, a steering control device, and a steering control method that make it possible to improve the driving feeling.

A first aspect of the invention relates to a steering device. The steering device includes: a steering member that is provided in a vehicle and configured to be rotationally operated; an actuator that generates a torque assisting a steering operation on the steering member; a detection device that detects a torque applied to a steering shaft portion that rotates together with the steering member; and a steering control device that is configured to perform vibration suppression control to suppress vibrations transmitted to the steering member by adjusting a torque generated by the actuator, on a basis of a detected torque that is a torque detected by the detection device, wherein the steering control device is configured to control the actuator such that a torque of a frequency band in a first predetermined range, which corresponds to the detected torque is not suppressed.

The steering control device may be configured to control the actuator to permit to transmit, via the steering shaft portion, the torque of the frequency band in the first predetermined range, which corresponds to the detected torque.

The frequency band in the first predetermined range may be a frequency band of a torque that is required to be transmitted from a steered wheel of the vehicle (2) to the steering member.

The frequency band in the first predetermined range may be a frequency band that is equal to or higher than 10 Hz and equal to or lower than 40 Hz.

The steering control device may be configured to control the actuator such that a torque of a frequency band in a second predetermined range, which corresponds to the detected torque, is not suppressed. In this case, the frequency band in the second predetermined range may be a frequency band that is lower than the frequency band in the first predetermined range.

The frequency band in the second predetermined range may be a frequency band of a torque that is required to be transmitted from the steering member to the steered wheel of the vehicle.

The frequency band in the second predetermined range is a frequency band that is equal to or lower than 5 Hz.

The steering control device may be configured to control the actuator to change a torque transmission characteristic at a time when the torque of the frequency band in the first predetermined range is transmitted via the steering shaft portion and a torque transmission characteristic at a time when the torque of the frequency band in the second predetermined range is transmitted via the steering shaft portion, independently of each other.

The steering control device may be configured to perform a filtering process on the detected torque to calculate a torque to be generated by the actuator, and changes the torque transmission characteristic by changing a filter characteristic in the filtering process.

When the vehicle is braked, the steering control device may be configured to control the actuator to perform torque suppression control to suppress the torque of the frequency band in the first predetermined range.

The steering control device may be configured to control the actuator (8) to perform the torque suppression control, if at least one of a condition that a vehicle speed of the vehicle falls within a first predetermined vehicle speed range and a condition that an acceleration of the vehicle falls within a first predetermined acceleration range is fulfilled when the vehicle is braked.

The first predetermined vehicle speed range may be set in advance in accordance with a vehicle speed range in which vibrations are likely to occur in the vehicle during braking of the vehicle. The first predetermined acceleration range may be set in advance in accordance with an acceleration range in which vibrations are likely to occur in the vehicle during braking of the vehicle.

The steering control device may be configured to control the actuator to perform torque suppression control to suppress the torque of the frequency band in the first predetermined range, if the vehicle speed of the vehicle falls within a second predetermined vehicle speed range.

The second predetermined vehicle speed range may be set in advance in accordance with one of a vehicle speed range in which the steering member is likely to be steered in a stationary manner in the vehicle and a vehicle speed range in which a flutter is likely to occur in the vehicle.

The steering control device may be configured to control the actuator (8) to perform torque suppression control to suppress the torque of the frequency band in the first predetermined range for a predetermined period, if an absolute value of a derivative value of the detected torque is equal to or larger than a predetermined value.

The predetermined value and the predetermined period may be set in advance in accordance with a kickback that is likely to occur in the vehicle.

The torque suppression control may be control to suppress transmission of the torque of the frequency band in the first predetermined range via the steering shaft portion.

The steering control device may be configured to control the actuator such that vibration damping increases, in performing the torque suppression control.

A second aspect of the invention relates to a steering control device including a control unit configured to control a steering device including: a steering member that is provided in a vehicle and configured to be rotationally operated; an actuator that generates a torque assisting a steering operation on the steering member; a detection device that detects a torque applied to a steering shaft portion that rotates together with the steering member. The control unit is configured to perform vibration suppression control to suppress vibrations transmitted to the steering member by adjusting a torque generated by the actuator, on a basis of a detected torque that is a torque detected by the detection device, wherein the control unit is configured to control the actuator such that a torque of a frequency band in a first predetermined range, which corresponds to the detected torque, is not suppressed.

A third aspect of the invention relates to a control method for a steering device, wherein the steering device includes: a steering member that is provided in a vehicle and configured to be rotationally operated; an actuator that generates a torque assisting steering operation on the steering member; and a detection device that detects a torque applied to a steering shaft portion that rotates together with the steering member. The control method includes: performing vibration suppression control to suppress vibrations transmitted to the steering member by adjusting a torque to be generated by the actuator, on a basis of a detected torque that is a torque detected by the detection device; and controlling the actuator such that a torque of a frequency band in a first predetermined range, which corresponds to the detected torque, is not suppressed.

The steering device and the steering control device according to the foregoing configuration make it possible to improve the driving feeling.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The embodiments according to the invention will be described hereinafter in detail on the basis of the drawings. Incidentally, this invention is not limited by these embodiments thereof. Besides, components in the following embodiments of the invention include those which are easily replaceable by persons skilled in the art, or those which are substantially identical thereto.

[First Embodiment]

Figure 1:
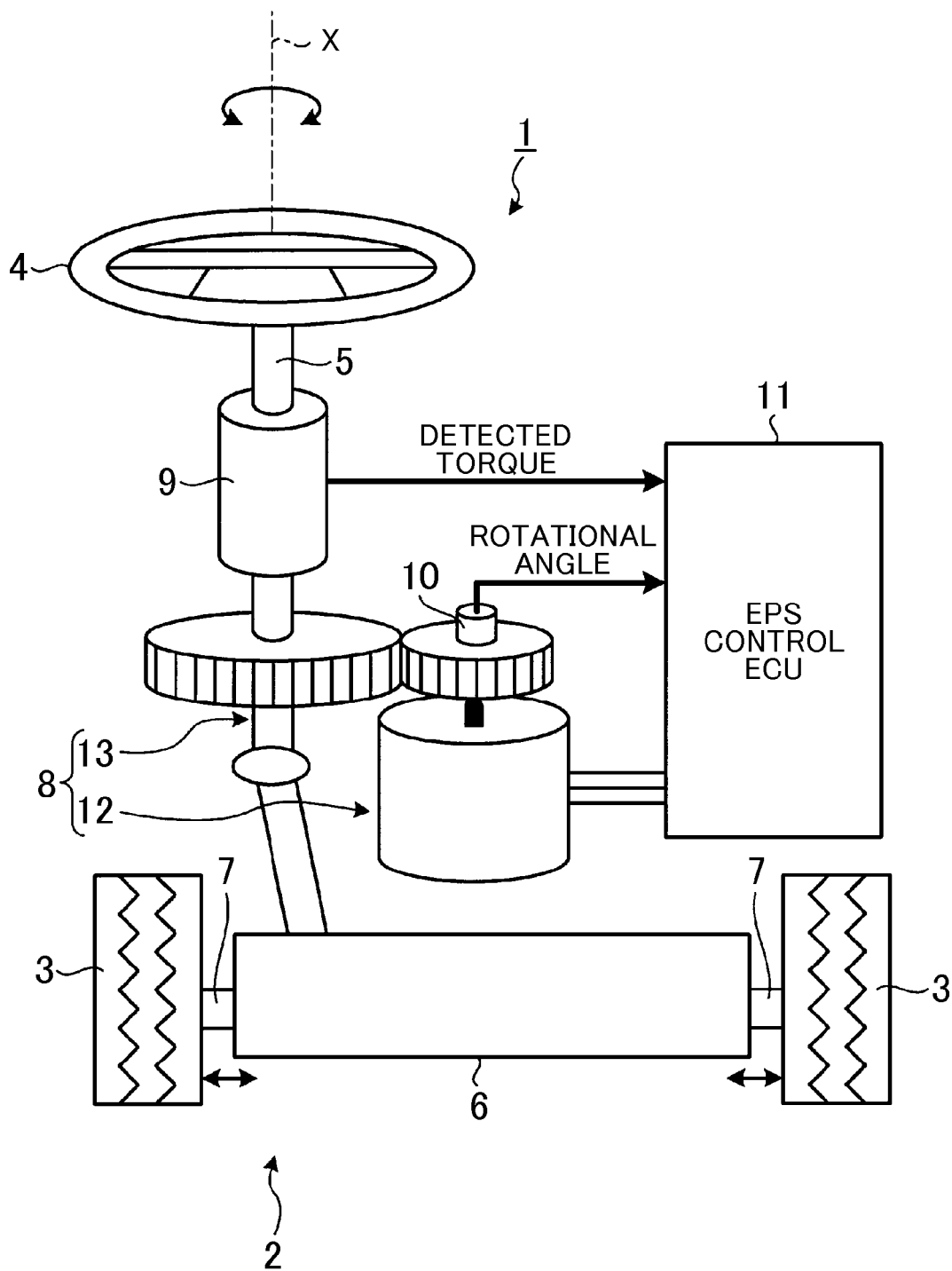
FIG. 1 is a schematic configuration diagram representing a general configuration of a steering device according to the first embodiment of the invention.
Figure 2:
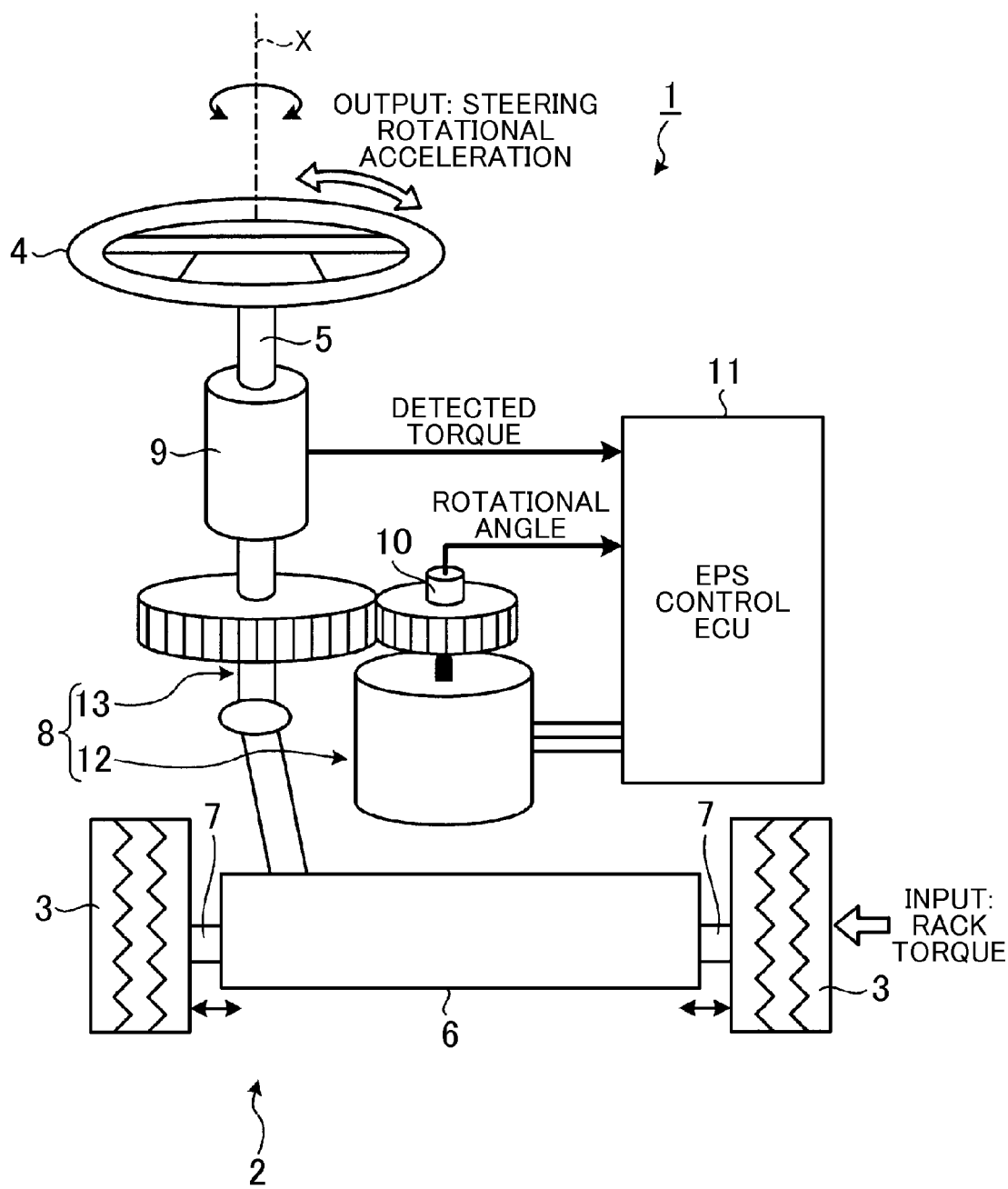
FIG. 2 is a schematic diagram illustrating a road information range in the steering device according to the first embodiment of the invention.
Figure 3:
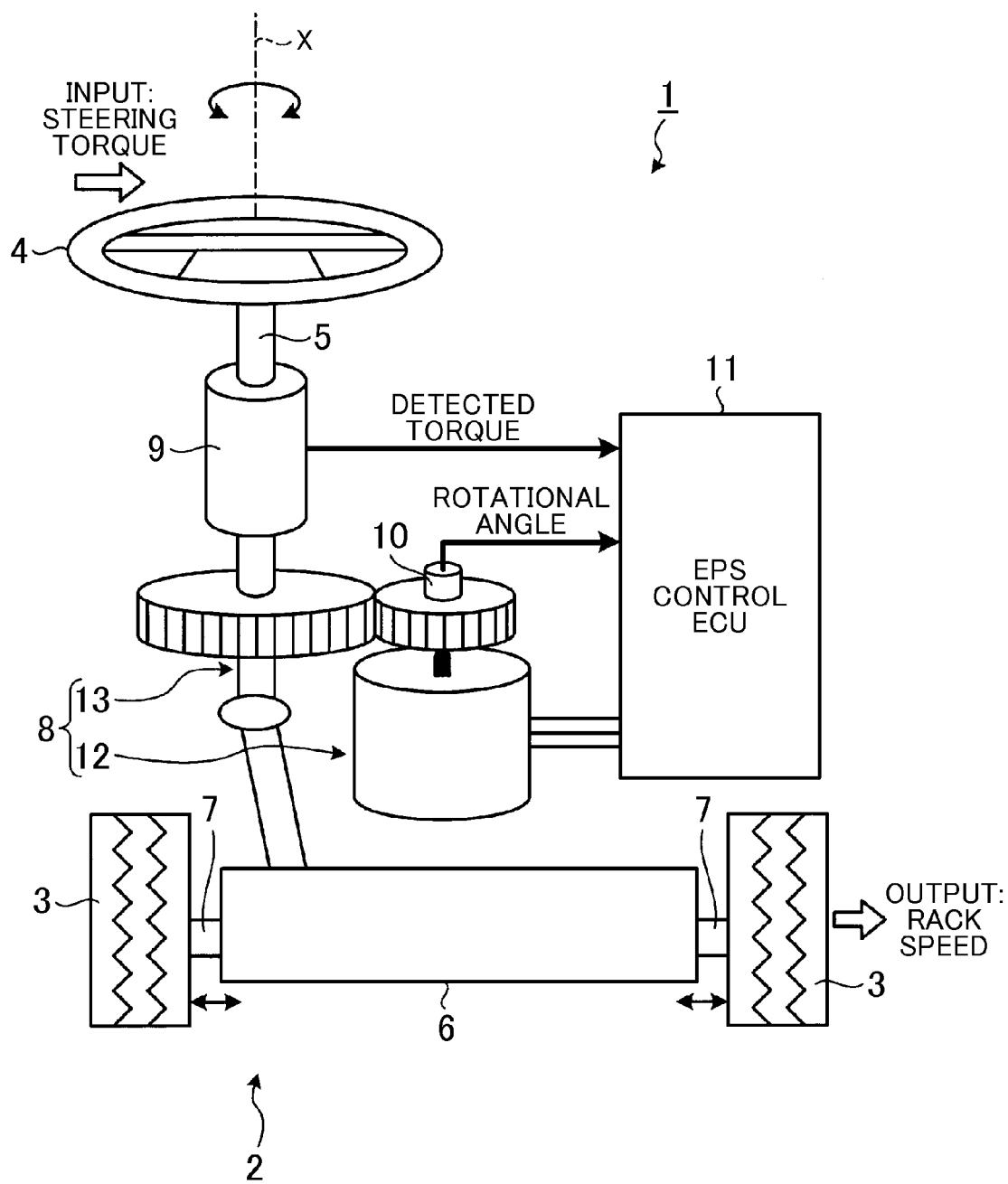
FIG. 3 is a schematic diagram illustrating a steering range in the steering device according to the first embodiment of the invention.
Figure 4:
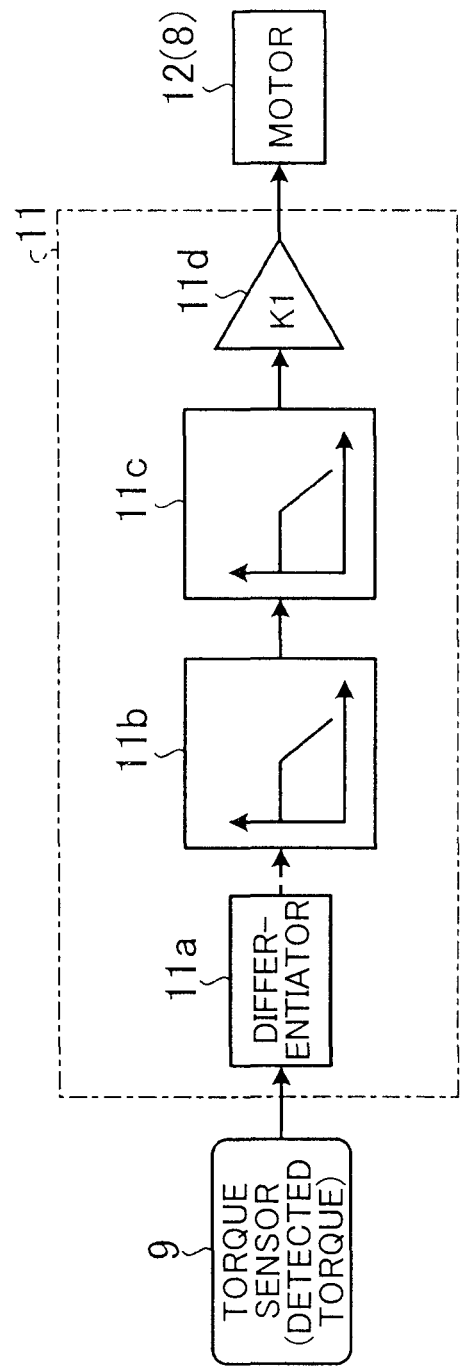
FIG. 4 is a block diagram showing an example of a general configuration of an EPS control ECU according to the first embodiment of the invention.
Figure 5:
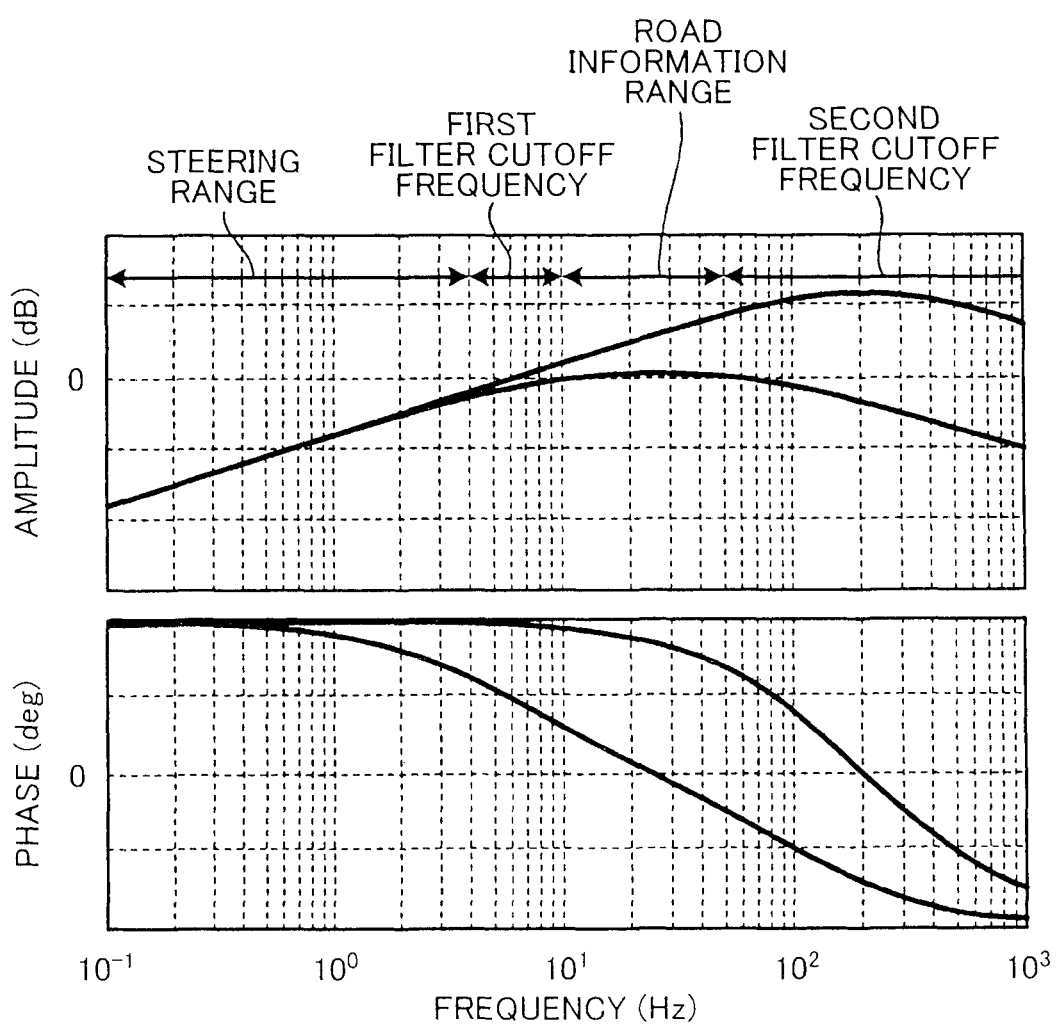
FIG. 5 is a bode diagram showing a filter characteristic in the EPS control ECU according to the first embodiment of the invention.
Figure 6:
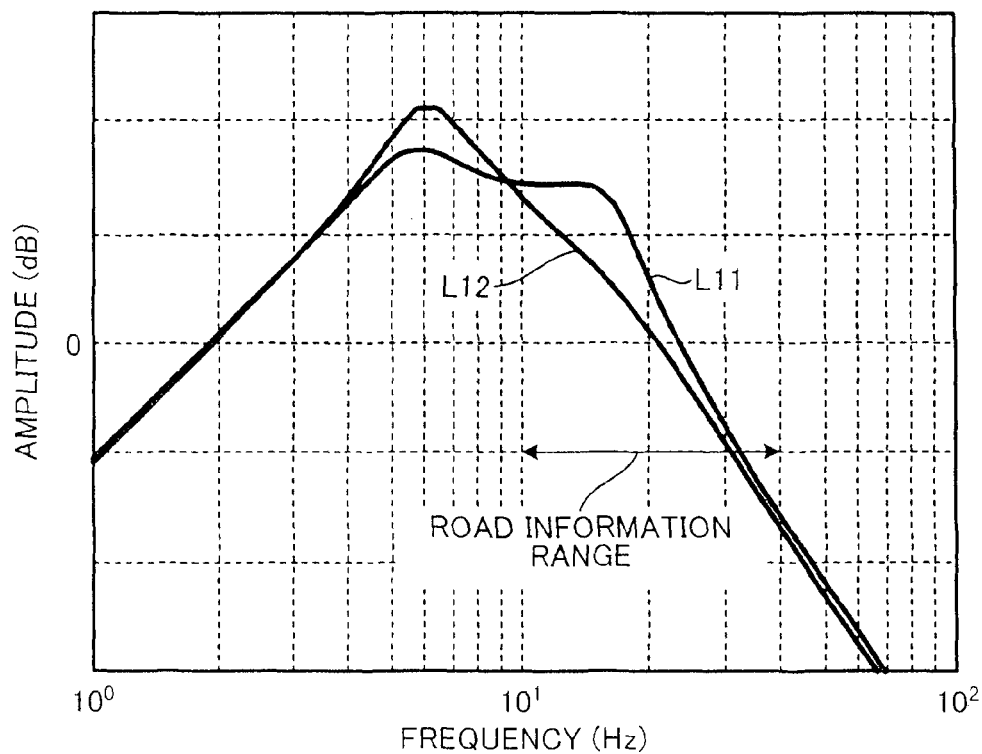
FIG. 6 is a diagram representing an example of a torque transmission characteristic in the road information range of the steering device according to the first embodiment of the invention.
Figure 7:
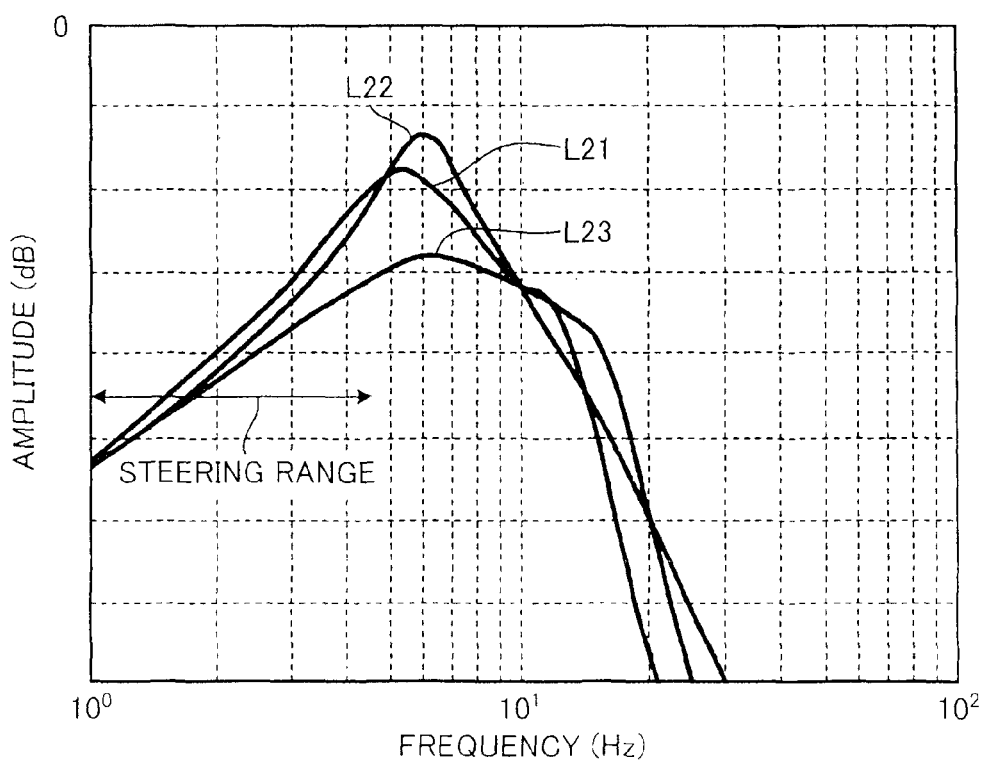
FIG. 7 is a diagram representing an example of a torque transmission characteristic in the steering range of the steering device according to the first embodiment of the invention.

FIG. 1 is a schematic configuration diagram representing a general configuration of a steering device according to the first embodiment of the invention. FIG. 2 is a schematic diagram illustrating a road information range in the steering device according to the first embodiment of the invention. FIG. 3 is a schematic diagram illustrating a steering range in the steering device according to the first embodiment of the invention. FIG. 4 is a block diagram showing an example of a general configuration of an EPS control ECU according to the first embodiment of the invention. FIG. 5 is a bode diagram showing a filter characteristic in the EPS control ECU according to the first embodiment of the invention. FIG. 6 is a diagram representing an example of a torque transmission characteristic in the road information range of the steering device according to the first embodiment of the invention. FIG. 7 is a diagram representing an example of a torque transmission characteristic in the steering range of the steering device according to the first embodiment of the invention.

A steering device 1 according to this embodiment of the invention shown in FIG. 1 is a device that is mounted on a vehicle 2 to steer steered wheels 3 of the vehicle 2. The steering device 1 according to this embodiment of the invention is a so-called electric power steering (EPS) device that assists a steering force of the vehicle 2 by a motive power of an electric motor or the like. The steering device 1 drives the electric motor or the like so as to obtain a steering assist force corresponding to a steering force that has been applied to a steering wheel, serving as a steering member, from a driver, thereby assisting the driver in performing steering operation.

More specifically, as shown in FIG. 1, the steering device 1 includes the steering wheel 4 serving as a steering member, a steering shaft (hereinafter abbreviated as "a shaft" unless otherwise noted) 5 serving as a steering shaft portion, a rack-and-pinion gear mechanism (hereinafter abbreviated as "a gear mechanism" unless otherwise noted) 6, a pair of right and left tie rods 7, an EPS device 8 serving as an actuator, a torque sensor 9 serving as a detection device, a rotational angle sensor 10, and an EPS control ECU 11 serving as a steering control device.

The steering wheel 4 is a member configured to be operated so as to rotate around a rotation axis X, and is provided in a driver seat of the vehicle. The driver can perform steering operation by operating this steering wheel 4 such that the steering wheel 4 rotates around the rotation axis X. That is, in the vehicle that is mounted with the steering device 1, the steered wheels 3 are steered (turned) through the operation on this steering wheel 4 by the driver.

The shaft 5 serves as a rotary shaft portion of the steering wheel 4. One end of the shaft 5 is coupled to the steering wheel 4, and the other end of the shaft 5 is coupled to the gear mechanism 6. That is, the steering wheel 4 is connected to the gear mechanism 6 via this shaft 5. The shaft 5 is configured to rotate around a central axis together with the steering wheel 4 along with the rotational operation of the steering wheel 4 by the driver. The shaft 5 may be divided into a plurality of members, for example, an upper shaft, an intermediate shaft, and a lower shaft and the like.

The gear mechanism 6 mechanically couples the shaft 5 to the pair of the tie rods 7. The gear mechanism 6 includes, for example, a so-called rack-and-pinion gear mechanism, and converts rotational movements of the shaft 5 around the central axis into rectilinear movements of the pair of the tie rods 7 in a lateral direction (which is typically equivalent to a vehicle width direction of the vehicle 2).

A proximal end of each of the pair of the tie rods 7 is coupled to the gear mechanism 6, and a tie rod end as a distal end of each of the pair of the tie rods 7 is coupled to a corresponding one of the steered wheels 3 via a knuckle arm. That is, the steering wheel 4 is coupled to the respective steered wheels 3 via the shaft 5, the gear mechanism 6, the respective tie rods 7, and the like.

The EPS device 8 assists the driver in performing steering operation on the steering wheel 4. That is, the EPS device 8 generates a torque for assisting the steering operation. The EPS device 8 outputs a steering assist force (an assist torque) that assists a steering force (a steering torque) that is input to the steering wheel 4 by the driver. In other words, the EPS device 8 assists the driver in performing steering operation by driving the steered wheels 3 of the vehicle 2 through the use of an electric motor or the like. The EPS device 8 assists the driver in performing steering operation by applying an assist torque to the shaft 5. It should be noted herein that the assist torque is a torque for assisting a steering torque. The steering torque is a torque that is applied to the shaft 5 in accordance with a steering force.

The EPS device 8 mentioned herein has a motor 12 as an electric motor, and a speed reducer 13. The EPS device 8 according to this embodiment of the invention is, for example, a column EPS device in which the motor 12 is provided on the shaft 5 such as an intermediate shaft or the like. The EPS device 8 is a so-called column assist-type assist mechanism.

The motor 12 is a column assist electric motor that is supplied with an electric power to generate a rotational motive power (a motor torque), and generates an assist torque as a steering assist force. The motor 12 is connected to the shaft 5 via the speed reducer 13 or the like in a manner allowing the transmission of motive power, and applies a steering assist force to the shaft 5 via the speed reducer 13 or the like. The speed reducer 13 reduces the speed of the rotational motive power of the motor 12, and transmits the rotational motive power to the shaft 5.

Due to the rotational driving of the motor 12, the rotational motive power generated by the motor 12 is transmitted to the shaft 5 via the speed reducer 13, whereby the EPS device 8 performs steering assist control. At this time, the rotational motive power generated by the motor 12 is reduced in speed by the speed reducer 13, increased in torque, and transmitted to the shaft 5. This EPS device 8 is electrically connected to the EPS control ECU 11, which will be described later, and the driving of the motor 12 is controlled by the EPS control ECU 11.

The torque sensor 9 detects a torque that is applied to the shaft 5, in other words, a torque that is generated in the shaft 5. The torque sensor 9 detects, for example, a torque that is applied to a torsion bar (not shown) serving as a torsion member constituting part of the EPS device 8. A detected torque as the torque detected by this torque sensor 9 is typically a torque reflecting a steering torque, a disturbance torque or the like. The disturbance torque is a torque that is input from the steered wheels 3 to the shaft 5 via the tie rod ends in accordance with the inputting of a road surface disturbance to the steered wheels 3 or the like. The torque sensor 9 is electrically connected to the EPS control ECU 11, and outputs a detection signal corresponding to the detected torque to the EPS control ECU 11. The detected torque is used for, for example, steering assist control or the like by the EPS control ECU 11.

The rotational angle sensor 10 detects a rotational angle of a rotor shaft of the motor 12. The rotational angle sensor 10 is electrically connected to the EPS control ECU 11, and outputs a detection signal corresponding to the detected rotational angle to the EPS control ECU 11. The rotational angle that is detected by the rotational angle sensor 10 is used for, for example, the control of current supplied to the motor 12 by the EPS control ECU 11.

The EPS control ECU 11 controls the driving of the EPS device 8. The EPS control ECU 11 is an electronic control unit that is mainly composed of a known microcomputer including a CPU, a ROM, a RAM, and an interface. For example, the EPS device 8 and various sensors such as the aforementioned torque sensor 9, the aforementioned rotational angle sensor 10 and the like are electrically connected to the EPS control ECU 11. Electric signals (detection signals) corresponding to detection results are input from the various sensors to the EPS control ECU 11. The EPS control ECU 11 outputs a drive signal to the EPS device 8 in accordance with the input detection results, and controls the driving of the EPS device 8. Incidentally, this EPS control ECU 11 may be configured to be electrically connected to, for example, an ECU that controls respective portions of the vehicle 2 that is mounted with the steering device 1, and to exchange information such as detection signals, drive signals, control commands and the like with this ECU, or may be configured integrally with this ECU.

The EPS control ECU 11 controls the EPS device 8 to adjust the assist torque generated by the EPS device 8, on the basis of, for example, a detected torque (a detection signal corresponding to the detected torque) or the like. The EPS control ECU 11 adjusts the output torque of the motor 12 by adjusting the assist current as a current supplied to the motor 12, thereby adjusting the assist torque. It should be noted herein that the assist current is a supplied current having magnitude that allows the EPS device 8 to generate the required predetermined assist torque. At this time, the EPS control ECU 11 controls the assist current to the motor 12 on the basis of, for example, a rotational angle detected by the rotational angle sensor 10 or the like.

The EPS control ECU 11 basically controls the motor 12 such that the EPS device 8 generates an assist torque corresponding to a steering torque, on the basis of a detected torque (steering assist control). Besides, the EPS control ECU 11 performs the control to suppress vibrations in the rotational direction (the circumferential direction of the steering wheel 4) that act on the steering wheel 4, namely, vibrations in the direction around the rotation axis X (vibration suppression control) by adjusting the assist torque generated by the EPS device 8, on the basis of a detected torque.

For example, in this steering device 1, when a disturbance such as an input from a road surface, brake vibrations (vibrations at the time of braking) or the like is input to the tie rods 7, this disturbance may be transmitted to the driver as vibrations of the steering wheel 4 in the rotational direction via the gear mechanism 6 and the shaft 5. Thus, the EPS control ECU 11 suppresses vibrations of the steering wheel 4 in the rotational direction that correspond to the disturbance input via the tie rods 7, by adjusting the output torque of the motor 12 in accordance with a driving state to adjust the assist torque generated by the EPS device 8. That is, the EPS device 8 also serves as a vibration suppression device that generates an assist torque to suppress vibrations resulting from the inputting of a disturbance from the steered wheels 3. The EPS control ECU 11 corrects the assist characteristic of this EPS device 8 to suppress disturbance vibrations.

In the steering device 1 configured as described above, a steering torque and an assist torque generated by the EPS device 8 are applied to the shaft 5. Then, in the steering device 1, when a steering force and a steering assist force are applied from the shaft 5 to the tie rods 7 via the gear mechanism 6, these tie rods 7 are displaced in the lateral direction by an axial force having magnitude corresponding to the steering torque and the assist torque. As a result, the steered wheels 3 are turned.

As a result, the steering device 1 can turn the steered wheels 3 by the steering force input from the driver to the steering wheel 4, and the steering assist force generated by the EPS device 8. Thus, the steering device 1 can assist the driver in performing steering operation, and can alleviate the burden on the driver during steering operation. At this time, the assist torque generated by the EPS device 8 is adjusted by the EPS control ECU 11, whereby the steering device 1 can suppress vibrations in the rotational direction (a torque input from a road surface and the like) which are applied to the steering wheel 4. Accordingly, the assist torque is adjusted through the adjustment of the output of the motor 12, whereby the steering device 1 can assist the driver in performing steering operation, and can suppress vibrations in the rotational direction that are applied to the steering wheel 4.

Meanwhile, the EPS control ECU 11 controls the EPS device 8 to control, for example, the transmission characteristic of vibrations (a torque) transmitted from the road surface to the steering wheel 4 by the EPS device 8, whereby the steering device 1 according to this embodiment of the invention achieves an improvement in driving feeling (steering feeling).

In this case, the EPS device 8 according to this embodiment of the invention also serves as an adjustment device that adjusts vibrations of the steering wheel 4 in the rotational direction. That is, the EPS device 8 changes the degree of transmission of vibrations of the steering wheel 4 in the rotational direction, which are transmitted to the steering wheel 4. The EPS control ECU 11 controls the EPS device 8 in accordance with the driving state of the vehicle 2 to perform the control to adjust the vibrations of the steering wheel 4 in the rotational direction, thereby making it possible to adjust a magnitude of the vibrations of the steering wheel 4 in the rotational direction to a suitable magnitude in accordance with the driving state of the vehicle 2. For example, depending on the driving state, the EPS control ECU 11 controls the EPS device 8 such that the vibrations of the steering wheel 4 in the rotational direction does not decrease (the torque input from the road surface is not suppressed). Furthermore, the EPS control ECU 11 realizes the assist characteristic and vibration suppression performance that are suited for the driving state of the vehicle 2 by allowing the steering wheel 4 to vibrate in the rotational direction in accordance with the driving state of the vehicle 2, or in some cases, by positively increasing the vibrations of the steering wheel 4 in the rotational direction.

More specifically, the EPS control ECU 11 according to this embodiment of the invention controls the EPS device 8 such that the torque of a frequency band in a first predetermined range, which corresponds to the detected torque, is not suppressed (i.e., the EPS control ECU 11 controls the EPS device 8 to stop suppressing the torque of a frequency band in the first predetermined range, which corresponds to the detected torque). Also herein, the EPS control ECU 11 further controls the EPS device 8 such that the torque of a frequency band in a second predetermined range, which corresponds to the detected torque, is not suppressed (i.e., the EPS control ECU 11 controls the EPS device 8 to stop suppressing the torque of a frequency band in the second predetermined range, which corresponds to the detected torque) as well. It should be noted herein that the frequency band in the second predetermined range is lower than the frequency band in the first predetermined range.

It should be noted herein that the frequency band in the first predetermined range is a frequency band of a torque (vibrations) that is required to be transmitted from the steered wheels 3 of the vehicle 2 to the steering wheel 4, and may be referred to as "a road information range" in the following description. This road information range is a torque frequency band in which a rack torque, which has been input from the steered wheels 3 to a rack of the gear mechanism 6 as exemplified in FIG. 2, is required to be transmitted to the steering wheel 4 to change the rotational acceleration of the steering wheel 4. The road information range is set in advance in accordance with the evaluation of an actual vehicle or the like. The road information range is, for example, a frequency band that is equal to or higher than 10 Hz and equal to or lower than 40 Hz.

On the other hand, the frequency band in the second predetermined range is a frequency band of a torque that is required to be transmitted from the steering wheel 4 to the steered wheels 3 of the vehicle 2 during, for example, steering assist control or the like, and may be referred to as "a steering range" in the following description. This steering range is a torque frequency band in which a steering torque input to the steering wheel 4 is required to be transmitted from the steering wheel 4 to the steered wheels 3, as exemplified in FIG. 3, to change the speed of the rack of the gear mechanism 6. The steering range is set in advance in accordance with the evaluation of an actual vehicle or the like. The steering range is, for example, a frequency band that is higher than 0 Hz and equal to or lower than 5 Hz.

The EPS control ECU 11 according to this embodiment of the invention controls the EPS device 8 to permit to transmit via the shaft 5 (to pass through the shaft 5) the torque in the road information range corresponding to the detected torque and the torque in the steering range corresponding to the detected torque. That is, the EPS control ECU 11 controls the EPS device 8 such that the torque in the road information range, which corresponds to the detected torque, is permitted to transmit from the steered wheels 3 to the steering wheel 4 via the shaft 5 and the torque in the steering range, which corresponds to the detected torque, is permitted to transmit from the steering wheel 4 to the steered wheels 3 via the shaft 5. That is, if the input torque from the road surface has been suppressed by adjusting the assist torque through, for example, existing vibration suppression control as described above, the EPS control ECU 11 permit to transmit the input torque from the road surface, which corresponds to the road information range, without being suppressed. Besides, the EPS control ECU 11 also permits to transmit the input torque from the steering wheel 4, which corresponds to the steering range, without being suppressed. On the other hand, the EPS control ECU 11 controls the EPS device 8 to suppress transmission of the torque in ranges other than the road information range and the steering range, which corresponds to the detected torque, via the shaft 5. That is, the EPS control ECU 11 controls the EPS device 8 to suppress the transmission of the torque in the range other than the steering range and the road information range, which corresponds to the detected torque, from the steered wheels 3 to the steering wheel 4 via the shaft 5 and from the steering wheel 4 to the steered wheels 3 via the shaft 5.

It should be noted herein that an example of the general configuration of the EPS control ECU 11 for realizing the control as described above will be described with reference to the block diagram of FIG. 4.

The EPS control ECU 11 performs various filtering processes for removing a predetermined frequency component from a detection signal corresponding to the detected torque. Besides, the EPS control ECU 11 calculates a torque to be generated by the EPS device 8, i.e., an output torque of the motor 12 in this case, by subjecting phase compensation or the like to a signal subjected to a filtering process. Then, the EPS control ECU 11 supplies an assist current corresponding to the calculated output torque to the motor 12, adjusts the output torque of the motor 12 to adjust the assist torque generated by the EPS device 8 to a predetermined magnitude. In this case, the EPS control ECU 11 further performs torque differentiation control (torque differentiation compensation), thereby achieving an improvement in responsiveness of assist torque control or the like as well. As a result, a feeling of inertia during steering is eliminated and a light steering feeling is realized.

The EPS control ECU 11 exemplified in FIG. 4 is configured to include a differentiator 11a, a first filter 11b, a second filter 11c, an amplifier 11d, and the like.

A detection signal corresponding to a detected torque is input from the torque sensor 9 to the differentiator 11a. Then, the differentiator 11a performs differentiation calculation on the basis of the detection signal, and outputs a signal corresponding to a calculation result to the first filter 11b.

Through the first filter 11b, the signal input from the differentiator 11a is subjected to a filtering process with a predetermined filter characteristic, and the signal subjected to the filtering process is output to the second filter 11c. The filter characteristic of the first filter 11b according to this embodiment of the invention is set such that the cutoff frequency is higher than the frequency corresponding to the steering range and lower than the frequency corresponding to the road information range.

Through the second filter 11c, the signal input from the first filter 11b is subjected to a filtering process with a predetermined filter characteristic, and the signal subjected to the filtering process is output to the amplifier 11d. The filter characteristic of the second filter 11c according to this embodiment of the invention is set such that the cutoff frequency is higher than the frequency corresponding to the road information range.

The amplifier 11d amplifies a signal input from the second filter 11c with a predetermined gain K1, and outputs an assist current corresponding to the amplified signal to the motor 12. Thus, the motor 12 generates an output torque of a predetermined magnitude, which corresponds to the detected torque.

FIG. 5 is a bode diagram showing an example of the filter characteristic in the EPS control ECU 11 configured as described above. In this case, the cutoff frequency of the first filter 11b is set to, for example, a frequency band that is higher than 5 Hz and lower than 10 Hz, and the cutoff frequency of the second filter 11c is set to, for example, a frequency band that is higher than 40 Hz.

The steering device 1 configured as described above can realize a light steering characteristic through steering assist control in, for example, the steering range (to 5 Hz). Besides, the steering device 1 can suppress disturbance vibrations or the like through vibration suppression control in the range other than the steering range and the road information range, and can thereby suppress, for example, a feeling of discomfort imparted to the driver by disturbance vibrations caused by the road surface or the like. Additionally, the steering device 1 permits to transmit a torque via the shaft 5 in the road information range (10 Hz to 40 Hz), and can transmit vibrations (a torque) caused by the road surface from the steered wheels 3 to the steering wheel 4. As a result, in accordance with the driving state, the steering device 1 can appropriately perform steering assist control, for example, in the steering range, transmit vibrations needed, for example, to grasp a road surface condition to the steering wheel 4 in the road information range, and appropriately shut off unnecessary vibrations in the other ranges. That is, the steering device 1 can advise the driver of information on a driving state such as a road surface condition or the like through vibrations of the steering wheel 4 in the rotational direction in the road information range. That is, according to the steering device 1, so-called road information such as a road surface condition or the like can be conveyed to the driver.

Besides, for example, the steering device 1 can also permit to transmit vibrations needed to, for example, grasp a road surface condition or the like and convey road information by stopping torque differentiation control as described above. In this case, however, deterioration in driving feeling (steering feeling) may be incurred from the standpoint of eliminating a feeling of inertia during steering and realizing a light steering feeling. On the other hand, as described above, the steering device 1 according to this embodiment of the invention can reduce the feeling of inertia during steering and realize a light steering characteristic in the steering range, and can realize a transmission characteristic in which vibrations (a torque) caused by the road surface are transmitted to the steering wheel 4 without being suppressed by the EPS device 8 in the road information range.

Each of FIGS. 6 and 7 is a diagram showing an example of a torque transmission characteristic of the steering device 1 configured as described above. FIG. 6 represents a torque transmission characteristic at the time when a torque in the road information range is transmitted via the shaft 5 (hereinafter referred to as "a road information range torque transmission characteristic" in some cases). FIG. 7 represents a torque transmission characteristic at the time when a torque in the steering range is transmitted via the shaft 5 (hereinafter referred to as "a steering range torque transmission characteristic" in some cases). As described above with reference to FIG. 2, the road information range torque transmission characteristic is a torque transmission characteristic at the time when a rack torque, which has been input from the steered wheels 3 to the rack of the gear mechanism 6, is transmitted to the steering wheel 4. As described above with reference to FIG. 3, the steering range torque transmission characteristic is a transmission characteristic at the time when a steering torque input to the steering wheel 4 is transmitted from the steering wheel 4 to the steered wheels 3.

As shown in FIG. 6, in comparison with a torque transmission characteristic according to a comparative example (indicated by a solid line L12), the road information range torque transmission characteristic according to this embodiment of the invention (indicated by a solid line L11) is a characteristic in which vibrations transmitted to the steering wheel 4 increases in the road information range. Besides, as shown in FIG. 7, the steering range torque transmission characteristic according to this embodiment of the invention (indicated by a solid line L21) is substantially equivalent to a torque transmission characteristic according to a first comparative example (indicated by a solid line L22). In the first comparative example, the filtering process in the first filter 11b or the second filter 11c is not performed. Then, in comparison with a torque transmission characteristic according to a second comparative example (indicated by a solid line L23), the steering range torque transmission characteristic according to this embodiment of the invention (indicated by the solid line L21) is a characteristic that makes it possible to realize a light steering characteristic by reducing the feeling of inertia. In the second comparative example, torque differentiation control is not performed.

The steering device 1 according to the embodiment of the invention described above includes: the steering wheel 4 that is provided in the vehicle 2 and configured to be rotationally operated; the EPS device 8 that generates a torque assisting steering operation on the steering wheel 4; the torque sensor 9 that detects a torque applied to the shaft 5 rotating together with the steering wheel 4; and the EPS control ECU 11 that performs vibration suppression to suppress vibrations transmitted to the steering wheel 4 by adjusting the torque generated by the EPS device 8 on the basis of a detected torque as a torque detected by the torque sensor 9. Furthermore, the EPS control ECU 11 controls the EPS device 8 such that the torque in the road information range as a frequency band in the first predetermined range, which corresponds to the detected torque, is not suppressed.

Accordingly, the steering device 1 and the EPS control ECU 11 permits to transmit a vibration torque in the road information range, which is needed to realize a comfortable driving feeling, to convey road information to the driver. That is, the steering device 1 and the EPS control ECU 11 can transmit to the steering wheel 4 an input torque from the road surface in the road information range, and thus can convey the input torque from the road surface to the driver. That is, necessary road information can be conveyed to the driver. As a result, the steering device 1 and the EPS control ECU 11 can improve the driving feeling (the steering feeling). Furthermore, when the input torque from the road surface is suppressed by adjusting the assist torque generated by the EPS device 8 through vibration suppression control, the EPS control ECU 11 permits to transmit the input torque from the road surface, which corresponds to the road information range as a frequency band in the first predetermined range, without being suppressed. Thus, the steering device 1 and the EPS control ECU 11 can improve the driving feeling and facilitate the steering operation by the driver.

Besides, the steering device 1 and the EPS control ECU 11 can achieve an improvement in driving feeling as described above, using the torque sensor 9 as provided widely in a general steering device instead of using, for example, a tie rod axial force sensor, a steering angular velocity sensor or the like. As a result, the steering device 1 and the EPS control ECU 11 can reduce the number of parts constituting the device, and for example, can reduce the cost of manufacturing.

Furthermore, in accordance with the steering device 1 according to the embodiment of the invention described above, the EPS control ECU 11 controls the EPS device 8 such that the torque in the steering range as a frequency band in the second predetermined range, which corresponds to the detected torque as a torque detected by the torque sensor 9, is not suppressed. Accordingly, the steering device 1 and the EPS control ECU 11 can transmit to the steered wheels 3 an input torque in the steering range, which is input from the steering wheel 4 by the driver, and thus can realize a light steering feeling by reducing the feeling of inertia during steering. That is, appropriate frequency designing as described above is carried out in view of reduction of the feeling of inertia and the necessary vibration transmission characteristic, whereby the steering device 1 and the EPS control ECU 11 can achieve both an improvement in driving feeling through the conveyance of road information and an improvement in driving feeling through reduction of the feeling of inertia during steering or the like.

The EPS control ECU 11 according to this embodiment of the invention is not limited to the configuration exemplified in FIG. 4. For example, the EPS control ECU 11 may appropriately set a center frequency ($\omega_d$) and a damping ratio ($\zeta$) of a second-order band-pass filter (a BPF) to realize a filter characteristic equivalent to the aforementioned one of FIG. 5. In this case, a desired filter characteristic can be obtained by, for example, setting the center frequency ($\omega_d$) within the road information range (e.g., 10 to 40 Hz) and setting the damping ratio ($\zeta$) to a relatively high value (e.g., equal to or higher than 2). A mathematical formula (1) shown below is an example of a calculating formula of a transfer function G of the BPF.

$$G = \frac{2\zeta\omega_d S}{S^2 + 2\zeta\omega_d S + \omega_d^2} \quad (1)$$

[Second Embodiment]

Figure 8:
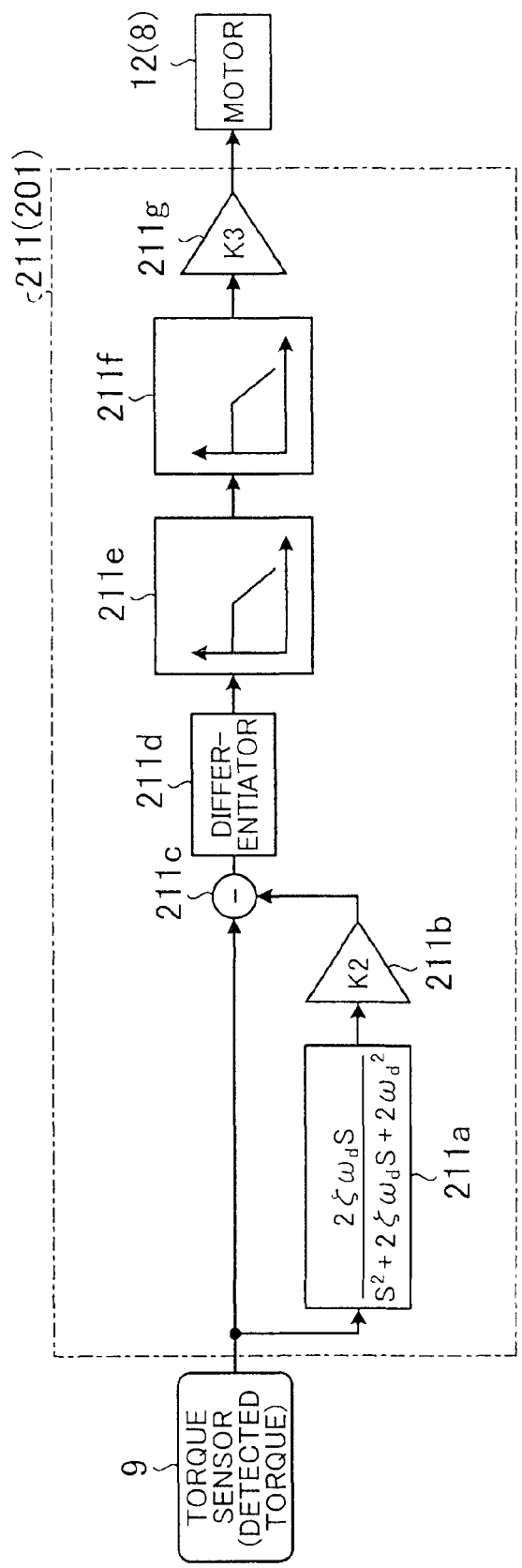
FIG. 8 is a block diagram showing an example of a general configuration of an EPS control ECU according to the second embodiment of the invention.
Figure 9:
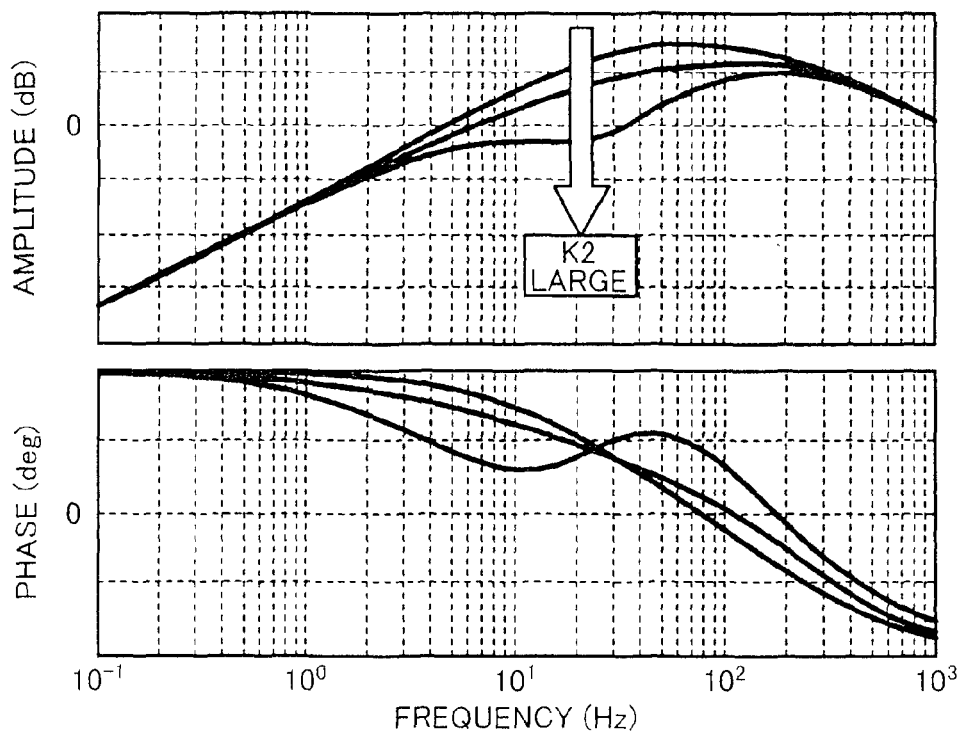
FIG. 9 is a bode diagram showing a filter characteristic in the EPS control ECU according to the second embodiment of the invention.
Figure 10:
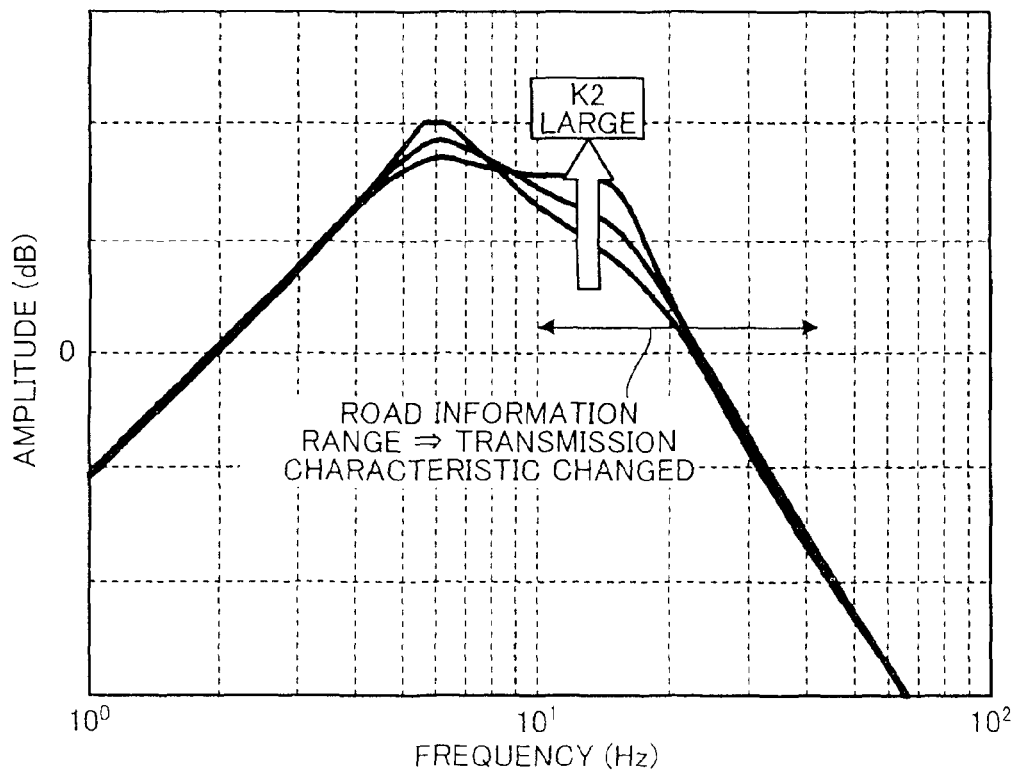
FIG. 10 is a diagram representing an example of a torque transmission characteristic in a road information range of the steering device according to the second embodiment of the invention.
Figure 11:
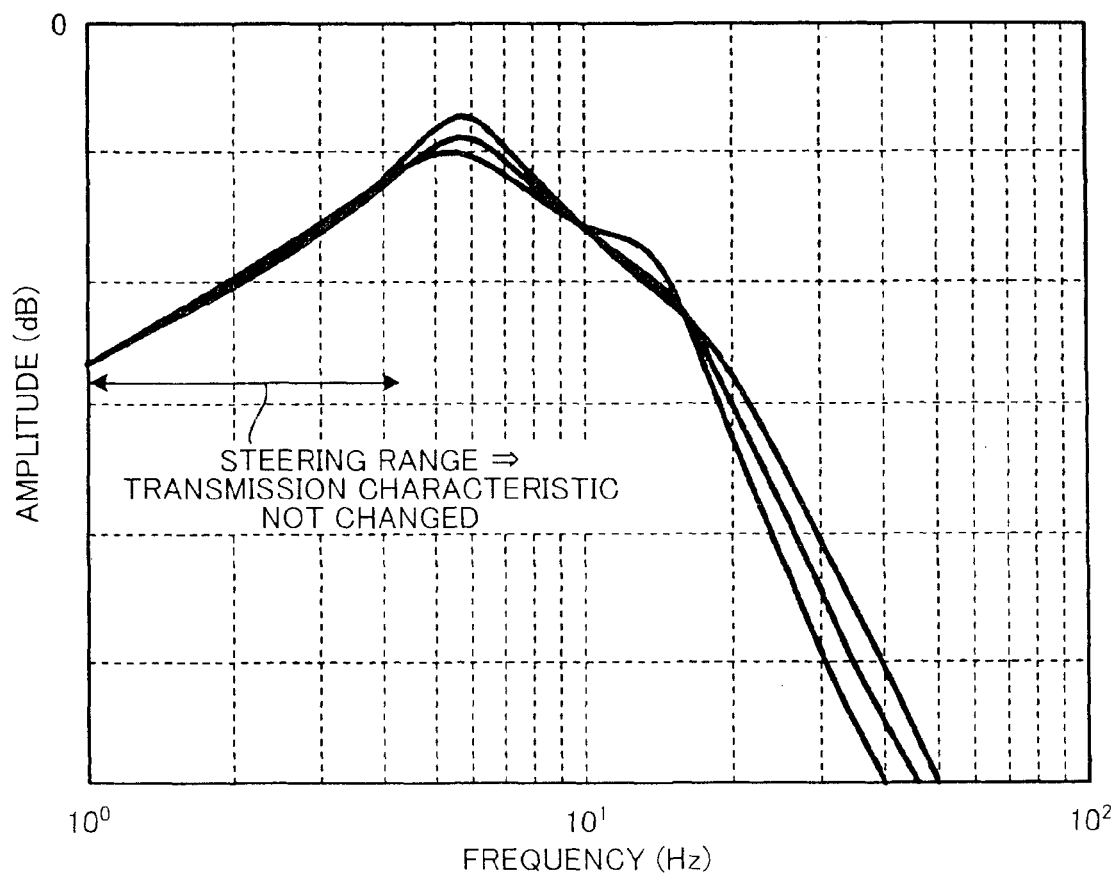
FIG. 11 is a diagram representing an example of a torque transmission characteristic in a steering range of the steering device according to the second embodiment of the invention.

FIG. 8 is a block diagram showing an example of a general configuration of an EPS control ECU according to the second embodiment of the invention. FIG. 9 is a bode diagram showing a filter characteristic in the EPS control ECU according to the second embodiment of the invention. FIG. 10 is a diagram representing an example of a torque transmission characteristic in a road information range of the steering device according to the second embodiment of the invention. FIG. 11 is a diagram representing an example of a torque transmission characteristic in a steering range of the steering device according to the second embodiment of the invention. The steering device and the steering control device according to the second embodiment of the invention are different from those of the first embodiment of the invention in that the torque transmission characteristic in the road information range and the torque transmission characteristic in the steering range are changed independently of each other. The description of the configuration, operation and effect that are common to the foregoing first embodiment of the invention is omitted as much as possible. Besides, FIG. 1 and the like will be referred to when appropriate, with respect to the respective configurations of the steering device and the steering control device according to the second embodiment of the invention (the same applies hereinafter).

An EPS control ECU 211 serving as a steering control device, which is included in a steering device 201 according to this embodiment of the invention shown in FIG. 8, changes the road information range torque transmission characteristic and the steering range torque transmission characteristic independently of each other.

The filter characteristics of the first filter 11b and the second filter 11c (see FIG. 5) of the EPS control ECU 11 (see FIG. 1) according to the foregoing first embodiment of the invention, when one of the road information range torque transmission characteristic and the steering range torque transmission characteristic is changed to a desired characteristic, the other torque transmission characteristic may be changed as well.

On the other hand, the EPS control ECU 211 according to this embodiment of the invention is configured as exemplified in FIG. 8, thereby realizing a configuration in which the road information range torque transmission characteristic and the steering range torque transmission characteristic are changed independently of each other.

The EPS control ECU 211 exemplified in FIG. 8 is configured to include a BPF 211a, a first amplifier 211b, a subtracter 211c, a differentiator 211d, a first filter 211e, a second filter 211f, a second amplifier 211g, and the like.

The EPS control ECU 211 according to this embodiment of the invention changes respective gains of the first amplifier 211b and the second amplifier 211g and respective filter characteristics (pass bands and cutoff frequencies) in filtering processes of the BPF 211a, the first filter 211e, and the second filter 211f, thereby making it possible to change the road information range torque transmission characteristic and the steering range torque transmission characteristic independently of each other.

A detection signal corresponding to a detected torque is input from the torque sensor 9 to the BPF 211a. Then, through the BPF 211a, the input signal is subjected to a filtering process with a predetermined filter characteristic, and the signal subjected to the filtering process is output to the first amplifier 211b. In this case, the EPS control ECU 211 mainly adjusts the filter characteristic of this BPF 211a, whereby the frequency band in which road information is conveyed is adjusted. The filter characteristic of the BPF 211a according to this embodiment of the invention is set such that the pass frequency band mainly corresponds to the road information range.

The first amplifier 211b amplifies the signal input from the BPF 211a with a predetermined gain K2, and outputs the amplified signal to the subtracter 211c. In this case, the EPS control ECU 211 adjusts the gain K2 of this first amplifier 211b, thereby adjusting the amount of torque transmission at the time when the torque in the road information range is transmitted via the shaft 5.

The subtracter 211c subtracts the signal input from the amplifier 211b from the detection signal corresponding to the detected torque, and outputs the subtracted signals to the differentiator 211d.

The differentiator 211d performs differential calculation on the basis of the signals input from the subtracter 211c, and outputs to the first filter 211e a signal corresponding to a calculation result.

Trough the first filter 211e, the signal input from the differentiator 211d is subjected to a filtering process with a predetermined filter characteristic, and the signal subjected to the filtering process is output to the second filter 211f.

Through the second filter 211f, the signal input from the first filter 211e is subjected to a filtering process with a predetermined filter characteristic, and the signal subjected to the filtering process is output to the second amplifier 211g.

The second amplifier 211g amplifies the signal input from the second filter 211f with a predetermined gain K3, and outputs to the motor 12 an assist current corresponding to the amplified signal. Thus, the motor 12 generates an output torque of a predetermined magnitude corresponding to the detected torque.

In this case, the EPS control ECU 211 adjusts the filter characteristics of the first filter 211e and the second filter 211f and the gain K3 of the second amplifier 211g, thereby adjusting the torque transmission characteristic in the steering range other than the road information range, and the torque transmission characteristic of high frequency (equal to or higher than 40 Hz).

FIG. 9 is a bode diagram showing an example of a filter characteristic in the EPS control ECU 211 configured as described above. In this case, for example, the EPS control ECU 211 adjusts the gain K2 of the first amplifier 211b, thereby making it possible to realize the filter characteristic as shown in this FIG. 9.

Then, the filter characteristic of the EPS control ECU 211 is adjusted as described above, whereby the steering device 201 can change the torque transmission characteristic as shown in FIGS. 10 and 11. It should be noted herein that FIG. 10 represents the road information range torque transmission characteristic, and that FIG. 11 represents the steering range torque transmission characteristic.

As shown in FIG. 10, as the road information range torque transmission characteristic according to this embodiment of the invention, the amount of torque transmission at the time when a torque in the road information range is transmitted via the shaft 5 is changed by, for example, changing the gain K2 of the first amplifier 211b. For example, the road information range torque transmission characteristic is changed such that the torque transmission amount is increased as the gain K2 of the first amplifier 211b is increased.

On the other hand, as shown in FIG. 11, the steering range torque transmission characteristic according to this embodiment of the invention can be fixed without being changed if, for example, the road information range torque transmission characteristic is changed as described above.

According to the foregoing configuration, the EPS control ECU 211 can control the EPS device 8 to change the torque transmission characteristic at the time when a torque of the frequency band in the first predetermined range (the road information range) is transmitted via the shaft 5, and the torque transmission characteristic at the time when a torque of the frequency band in the second predetermined range (the steering range) is transmitted via the shaft 5, independently of each other.

Accordingly, the steering device 201 and the EPS control ECU 211 according to this embodiment of the invention can adjust the driving feeling resulting from the conveyance of road information in the road information range, and the driving feeling resulting from reduction of the feeling of inertia or the like during steering in the steering range, independently of each other. Thus, the steering device 201 and the EPS control ECU 211 can facilitate the control for obtaining a desired characteristic, in each of the road information range and the steering range.

As a result, the steering device 201 and the EPS control ECU 211 can adjust the driving feeling. For example, the vibration level may be suppressed to improve quality in the vehicle 2, such as a luxury vehicle or the like, which requires a comfortable ride and, on the other hand, the amount of conveyance of road information may be increased in the sporty vehicle 2. In addition, the steering device 201 and the EPS control ECU 211 can, for example, adjust reduction of the feeling of inertia during steering in the steering range, the feeling of lightness, and the like, while maintaining the conveyance of road information.

[Third Embodiment]

Figure 12:
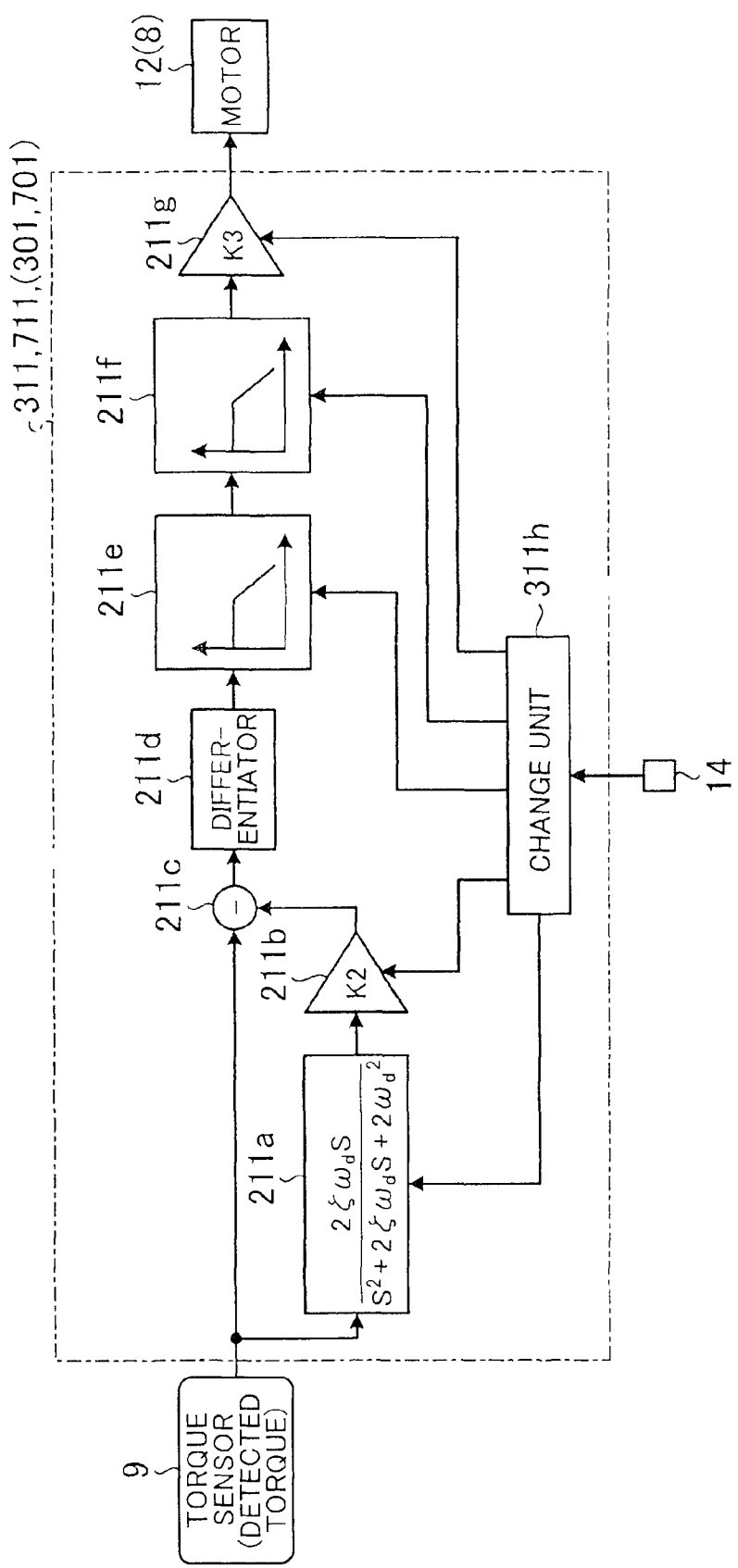
FIG. 12 is a block diagram showing an example of a general configuration of an EPS control ECU according to the third embodiment of the invention.
Figure 13:
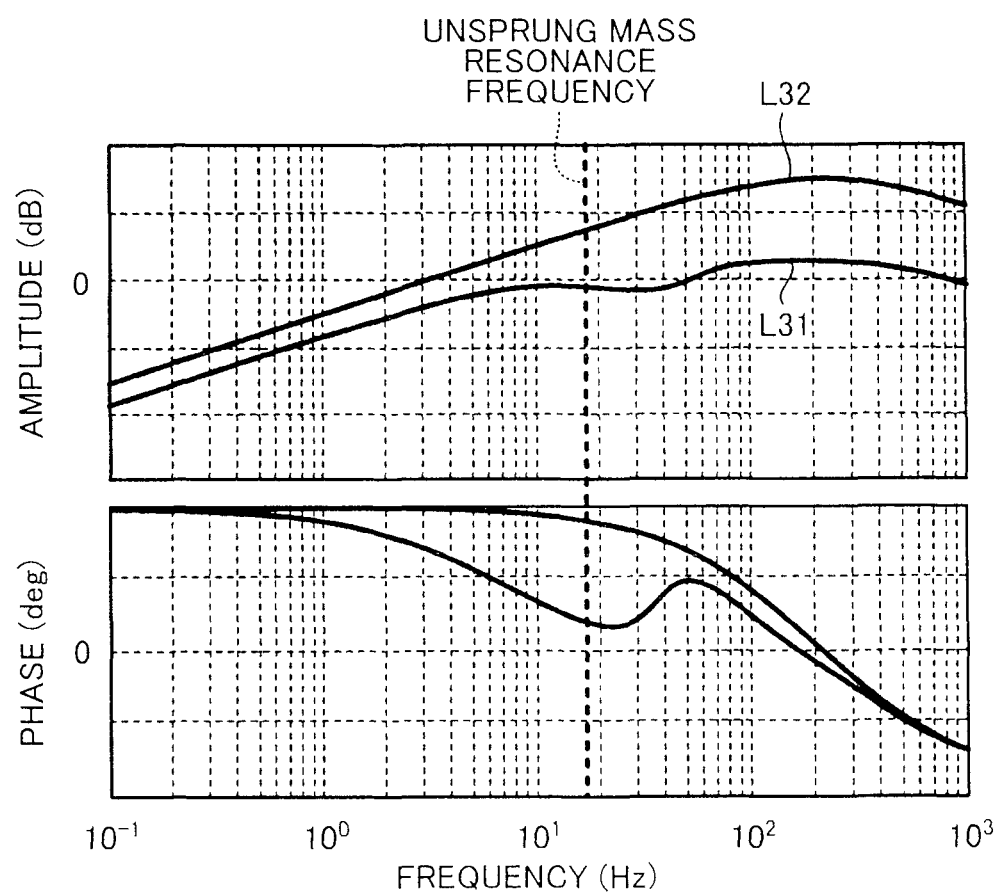
FIG. 13 is a bode diagram showing a filter characteristic in the EPS control ECU according to the third embodiment of the invention.
Figure 14:
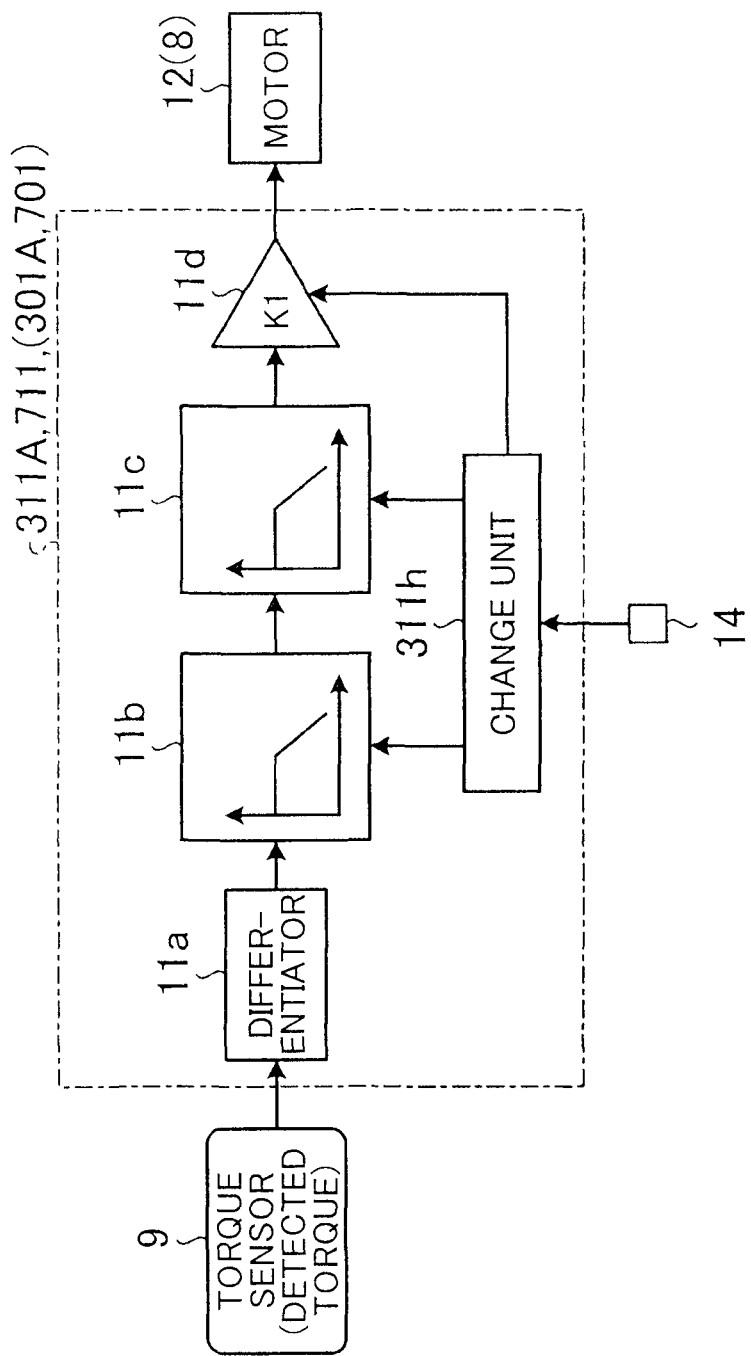
FIG. 14 is a block diagram showing an example of a general configuration of an EPS control ECU according to a modification example of the third embodiment of the invention.

FIG. 12 is a block diagram showing an example of a general configuration of an EPS control ECU according to the third embodiment of the invention. FIG. 13 is a bode diagram showing a filter characteristic in the EPS control ECU according to the third embodiment of the invention. FIG. 14 is a block diagram showing an example of a general configuration of an EPS control ECU according to a modification example of the third embodiment of the invention. The steering device and the steering control device according to the third embodiment of the invention are different from those of the first and second embodiments of the invention in that torque transmission is suppressed during the braking of the vehicle.

An EPS control ECU 311 serving as a steering control device, which is included in a steering device 301 according to this embodiment of the invention shown in FIG. 12, controls the EPS device 8 to perform torque suppression control to suppress the torque in the road information range (the frequency band in the first predetermined range) during the braking of the vehicle 2. The torque suppression control according to this embodiment of the invention is the control to suppress the transmission of the torque in the road information range via the shaft 5 (pass of the torque in the road information range through the shaft 5). That is, the EPS control ECU 311 controls the EPS device 8 to suppress the transmission of the torque in the road information range, which corresponds to the detected torque, from the steered wheels 3 to the steering wheel 4 via the shaft 5.

It should be noted herein that, for example, if the steering device 301 is configured to permit to convey road information as described above, the vibrations transmitted to the steering wheel 4 due to brake vibrations (vibrations during braking) during the braking of the vehicle 2 may increase. These brake vibrations tend to be caused, for example, at an unsprung mass resonance frequency (e.g., in the vicinity of 15 to 20 Hz) of the vehicle 2.

On the other hand, the EPS control ECU 311 according to this embodiment of the invention typically suppresses the brake vibrations by changing the filter characteristic to suppress the torque in the road information range during brake operation in the vehicle 2.

The EPS control ECU 311 according to this embodiment of the invention shown in FIG. 12 is configured to further include a change unit 311h in addition to the configuration described with reference to FIG. 8.

The change unit 311h changes the respective gains (the gains K2 and K3) of the first amplifier 211b and the second amplifier 211g, and the respective filter characteristics (pass bands and cutoff frequencies) in the filtering processes of the BPF 211a, the first filter 211e, and the second filter 211f. Thus, the change unit 311h changes the filter characteristic in the EPS control ECU.

A brake sensor 14 is electrically connected to this change unit 311h, and a detection signal about brake operation in the vehicle 2 is input from the brake sensor 14 to the change unit 311h. The brake sensor 14 detects, for example, at least one of an ON/OFF state of a brake switch, a brake pressure of a master cylinder (a master cylinder pressure), a brake pedal depression force applied to a brake pedal, a stroke of the brake pedal, a braking torque generated by a braking device, and the like, and outputs a result of detection to the change unit 311h as a detection signal about brake operation.

Then, if it is detected, on the basis of the detection signal about brake operation that has been input from the brake sensor 14, that brake operation is underway in the vehicle 2, the change unit 311h performs the control to suppress the torque in the road information range. That is, the change unit 311h changes at least one of the respective gains of the first amplifier 211b and the second amplifier 211g and the respective filter characteristics of the BPF 211a, the first filter 211e and the second filter 211f, and changes the road information range torque transmission characteristic, thereby suppressing transmission of the torque in the road information range via the shaft 5.

As a result, the EPS control ECU 311 can suppress transmission of the torque in the road information range, which corresponds to the detected torque, to the steering wheel 4 during the braking of the vehicle 2. In this case, the change unit 311h, for example, makes the gain K2 of the first amplifier 211b relatively small and sets a negative gain for certain frequencies, whereby the EPS control ECU 311 can effectively suppress brake vibrations transmitted to the steering wheel 4.

FIG. 13 is a bode diagram showing an example of the filter characteristic in the EPS control ECU 311 configured as described above. In this case, for example, the EPS control ECU 311 makes the gain K2 of the first amplifier 211b relatively small and makes the gain K3 of the second amplifier 211g relatively large through the change unit 311h during braking, thereby making a change from a filter characteristic indicated by a solid line L31 (when the brake is OFF) to a filter characteristic indicated by a solid line L32 (when the brake is ON) during brake operation, namely, during the braking of the vehicle 2.

Accordingly, the steering device 301 and the EPS control ECU 311 according to this embodiment of the invention control the EPS device 8 to suppress the torque in the road information range during the braking of the vehicle 2 while making an improvement in driving feeling (steering feeling), thereby making it possible to suppress transmission of vibrations to the steering wheel 4 due to brake vibrations. As a result, the steering device 301 and the EPS control ECU 311 can restrain unnecessary vibrations from being transmitted to the steering wheel 4 during braking, and can make a further improvement in driving feeling.

Incidentally, as shown in FIG. 14, an EPS control ECU 311A according to the modification example of this embodiment of the invention may be configured to further include the change unit 311h in addition to the configuration described with reference to FIG. 4. In this case, the change unit 311h changes the gain (the gain K1) of the amplifier 11d and the respective filter characteristics of the first filter 11b and the second filter 11c, whereby the EPS control ECU 311A can change the filter characteristic. That is, the change unit 311h changes at least one of the gain of the amplifier 11d and the respective filter characteristics of the first filter 11b and the second filter 11c during braking to change the road information range torque transmission characteristic, thereby suppress transmission of the torque in the road information range via the shaft 5. In this case as well, the steering device 301A and the EPS control ECU 311A can suppress transmission of vibrations to the steering wheel 4 due to brake vibrations, while making an improvement in driving feeling (steering feeling).

[Fourth Embodiment]

Figure 15:
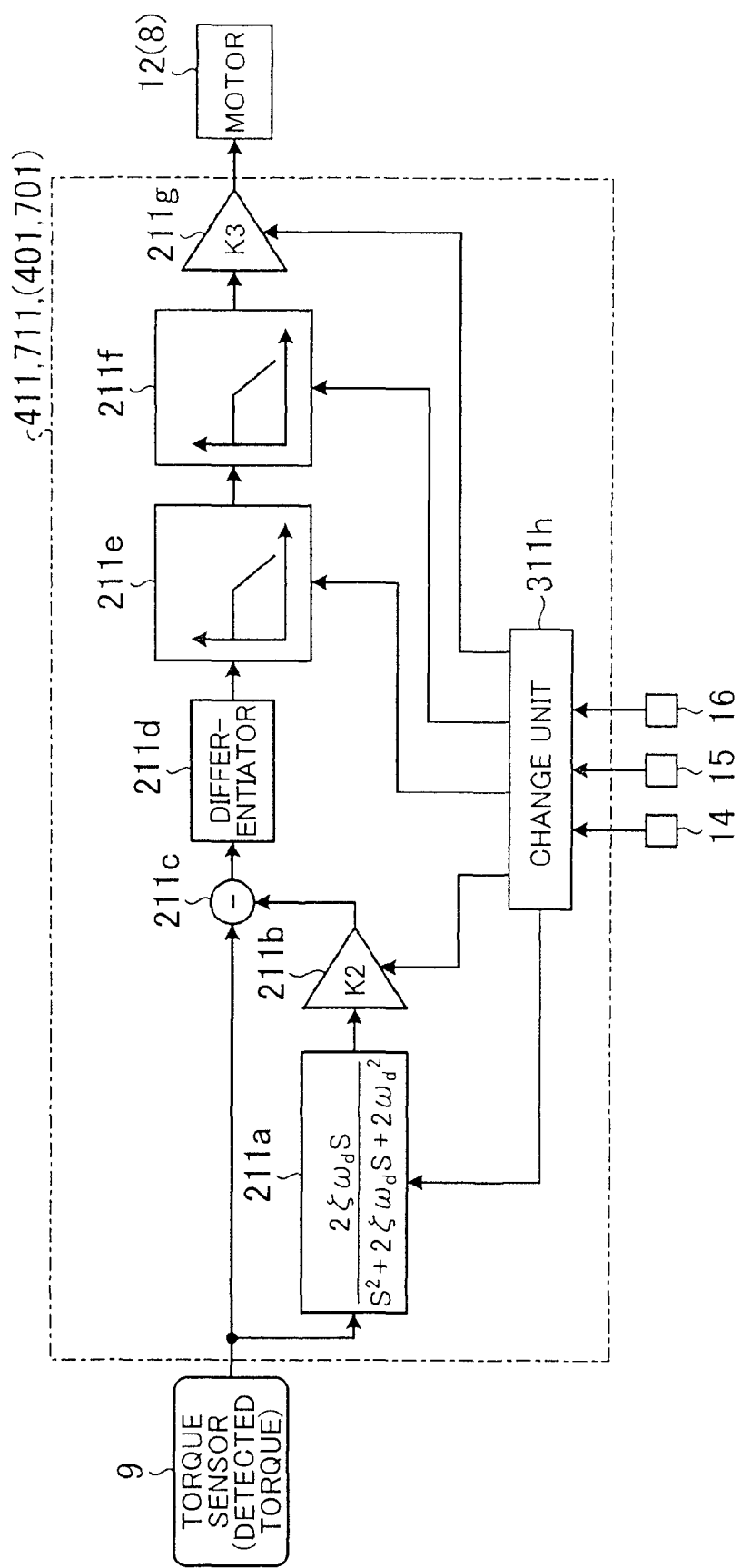
FIG. 15 is a block diagram showing an example of a general configuration of an EPS control ECU according to the fourth embodiment of the invention.
Figure 16:
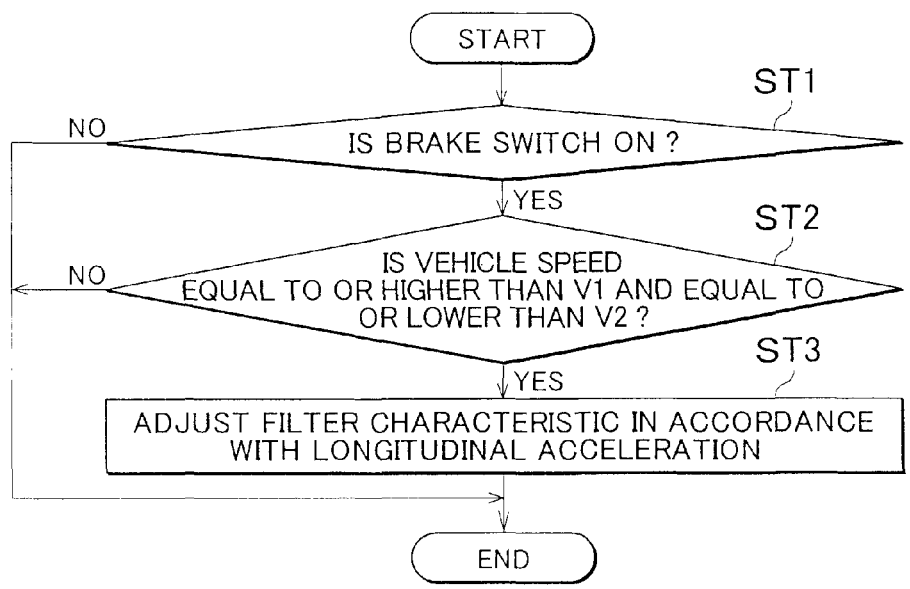
FIG. 16 is a flowchart illustrating an example of control by the EPS control ECU according to the fourth embodiment of the invention.
Figure 17:
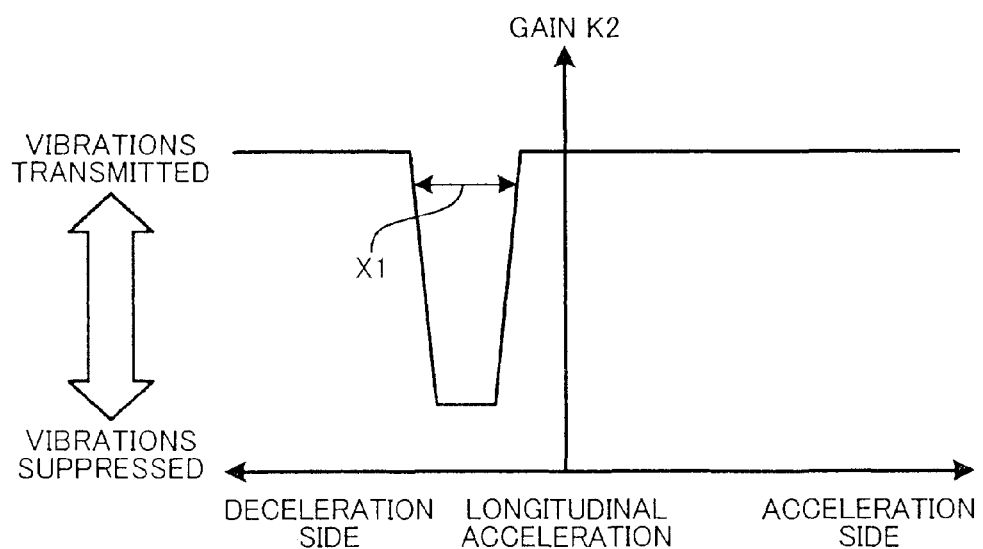
FIG. 17 is a diagram illustrating an example of the setting of a gain by the EPS control ECU according to the fourth embodiment of the invention.

FIG. 15 is a block diagram showing an example of a general configuration of an EPS control ECU according to the fourth embodiment of the invention. FIG. 16 is a flowchart illustrating an example of control by the EPS control ECU according to the fourth embodiment of the invention. FIG. 17 is a diagram illustrating an example of the setting of a gain by the EPS control ECU according to the fourth embodiment of the invention. The steering device and the steering control device according to the fourth embodiment of the invention are different from those according to the third embodiment of the invention in that the transmission of torque is suppressed if a predetermined condition is fulfilled during the braking of the vehicle.

An EPS control ECU 411 serving as a steering control device, which is included in a steering device 401 according to this embodiment of the invention shown in FIG. 12, controls the EPS device 8 to suppress the torque in the road information range (the frequency band in the first predetermined range) if a predetermined condition is fulfilled during the braking of the vehicle 2. In this case, the EPS control ECU 411 performs the control to suppress the torque in the road information range by changing the filter characteristic, on the basis of a vehicle speed as a running speed of the vehicle 2 and a longitudinal acceleration of the vehicle 2, during the braking of the vehicle 2.

It should be noted herein that the aforementioned steering device 301 (see FIG. 12) performs vibration suppression control every time the brake operation is performed and the vehicle 2 is braked. Thus, the torque in the road information range may not always be transmitted to the steering wheel 4 during braking.

Specifically, brake vibrations in the vehicle 2 are a phenomenon that arises, for example, in a situation where the vehicle 2 runs in an intermediate-to-high speed range while being gently braked, with a brake pad unevenly worn. Based on this fact, the EPS control ECU 411 according to this embodiment of the invention changes the filter characteristic on the basis of the vehicle speed and the acceleration, thereby limiting the scene in which the torque in the road information range is suppressed.

The change unit 311h according to this embodiment of the invention controls the EPS device 8 to suppress the torque in the road information range if at least one of a condition that the vehicle speed of the vehicle 2 be within a first predetermined vehicle speed range and a condition that the acceleration of the vehicle 2 be within a first predetermined acceleration range is fulfilled during the braking of the vehicle 2. In this case, the change unit 311h suppresses the transmission of torque in the road information range if both the condition that the vehicle speed of the vehicle 2 be within the first predetermined vehicle speed range and the condition that the longitudinal acceleration of the vehicle 2 be within the first predetermined acceleration range are fulfilled. It should be noted herein that the first predetermined vehicle speed range and the first predetermined acceleration range are set on the basis of, for example, an evaluation of the actual vehicle. The first predetermined vehicle speed range is set in advance in accordance with the vehicle speed range in which brake vibrations are likely to occur in the vehicle 2, and the first predetermined acceleration speed range is set in advance in accordance with the acceleration range in which brake vibrations are likely to occur in the vehicle 2.

A vehicle speed sensor 15 and a longitudinal acceleration sensor 16 as well as the brake sensor 14 are electrically connected to this change unit 311h. A detection signal about brake operation in the vehicle 2, a detection signal about the vehicle speed of the vehicle 2, and a detection signal about the longitudinal acceleration of the vehicle 2 are input from the brake sensor 14, the vehicle speed sensor 15, and the longitudinal acceleration sensor 16 to the change unit 311h respectively. The vehicle speed sensor 15, for example, detects a wheel speed or the like of the vehicle 2, detects (calculates) a vehicle speed on the basis of this wheel speed or the like, and outputs the detected vehicle speed to the change unit 311h as a detection signal about the vehicle speed of the vehicle 2. The longitudinal acceleration sensor 16, for example, detects a longitudinal acceleration applied to the vehicle 2 in the longitudinal direction, and outputs the detected longitudinal acceleration to the change unit 311h as a detection signal about the longitudinal acceleration of the vehicle 2. Incidentally, the detection signal about the longitudinal acceleration of the vehicle 2 may not be a detection signal detected by the longitudinal acceleration sensor 16. For example, it is also appropriate to use a detection signal detected by a sensor that detects a physical quantity correlated with the longitudinal acceleration of the vehicle 2, such as an amount of change in the stroke of a suspension, the stroke of the brake pedal, or the vehicle speed per unit time, or the like.

The change unit 311h performs the following control on the basis of the detection signal about brake operation, the detection signal about the vehicle speed of the vehicle 2, and the detection signal about the longitudinal acceleration of the vehicle 2, which have been input from the brake sensor 14, the vehicle speed sensor 15, and the longitudinal acceleration sensor 16 respectively. That is, if it is determined that the vehicle speed of the vehicle 2 is within the first predetermined vehicle speed range and the acceleration of the vehicle 2 is within the first predetermined acceleration range during the braking of the vehicle 2, the change unit 311h controls the EPS device 8 to suppress the torque in the road information range. In this case, the change unit 311h changes at least one of the respective gains of the first amplifier 211b and the second amplifier 211g and the respective filter characteristics (pass bands and cutoff frequencies) of the BPF 211a, the first filter 211e, and the second filter 211f to change the road information range torque transmission characteristic, thereby suppressing transmission of the torque in the road information range f via the shaft 5.

As a result, if the vehicle speed of the vehicle 2 falls within the first predetermined vehicle speed range and the acceleration of the vehicle 2 falls within the first predetermined acceleration range during the braking of the vehicle 2, namely, if the vehicle speed of the vehicle 2 falls within the vehicle speed range in which brake vibrations are likely to occur and the acceleration of the vehicle 2 falls within the acceleration range in which brake vibrations are likely to occur during the braking of the vehicle 2, the EPS control ECU 411 can suppress transmission of the torque in the road information range to the steering wheel 4. The change unit 311h, for example, makes the gain K2 of the first amplifier 211b relatively small, whereby the EPS control ECU 411 can effectively suppress transmission of brake vibrations to the steering wheel 4.

Next, an example of the control by the EPS control ECU 411 will be described with reference to the flowchart of FIG. 16. Incidentally, these control routines are repeatedly executed on a control cycle of several milliseconds to several dozens of milliseconds (the same will hold true hereinafter).

First of all, the EPS control ECU 411 determines, on the basis of a detection signal from the brake sensor 14, whether or not a brake switch is ON, namely, whether or not the vehicle 2 is being braked (step ST1).

If it is determined that the brake switch is ON, namely, that the vehicle 2 is being braked (step ST1: Yes), the EPS control ECU 411 determines, on the basis of a detection signal from the vehicle speed sensor 15, whether or not the current vehicle speed is equal to or higher than a first predetermined vehicle speed V1 and equal to or lower than a second predetermined vehicle speed V2 (V1≤vehicle speed≤V2) (step ST2). It should be noted herein that the first predetermined vehicle speed V1 and the second predetermined vehicle speed V2 are vehicle speeds set in accordance with the aforementioned first predetermined vehicle speed range, and are set in advance in accordance with brake vibrations that are likely to occur in the vehicle 2, on the basis of, for example, the evaluation of an actual vehicle or the like.

If it is determined that the current vehicle speed is equal to or higher than the first predetermined vehicle speed V1 and equal to or lower than the second predetermined vehicle speed V2 (V1≤vehicle speed≤V2) (step ST1: Yes), the EPS control ECU 411 adjusts the filter characteristic in accordance with the longitudinal acceleration of the vehicle 2, on the basis of a detection signal from the longitudinal acceleration sensor 16 (step ST3). Then, the EPS control ECU 411 ends the current control cycle, and proceeds to the next control cycle.

In this case, the change unit 311h of the EPS control ECU 411 changes the filter characteristic of the EPS control ECU 411 by, for example, adjusting the gain K2 of the first amplifier 211b in accordance with the longitudinal acceleration of the vehicle 2. The change unit 311h calculates, on the basis of, for example, a gain K2 map exemplified in FIG. 17, the gain K2 using the longitudinal acceleration of the vehicle 2, and sets the gain K2 of the first amplifier 211b. In the gain K2 map of FIG. 17, the axis of abscissa represents the longitudinal acceleration, and the axis of ordinate represents the gain K2. The gain K2 map describes a relationship between the longitudinal acceleration and the gain K2. The relationship between the longitudinal acceleration and the gain K2 is set in advance on the basis of the evaluation of the actual vehicle or the like. The gain K2 map is stored in a storage unit of the EPS control ECU 411. In this gain K2 map, the gain K2 is set so as to become relatively small in the aforementioned first predetermined acceleration range X1. The change unit 311h calculates, on the basis of this gain K2 map, the gain K2 of the first amplifier 211b using the input longitudinal acceleration. As a result, the change unit 311h makes the gain K2 of the amplifier 211b relatively small in the first predetermined acceleration range X1, on the basis of the aforementioned gain K2 map. Thus, if the vehicle speed of the vehicle 2 falls within the first predetermined vehicle speed range and the acceleration of the vehicle 2 falls within the first predetermined acceleration range during the braking of the vehicle 2, the EPS control ECU 411 can suppress transmission of the torque in the road information range from being transmitted to the steering wheel 4.

Incidentally, this embodiment of the invention has been described that the change unit 311h calculates and sets the gain K2 using the gain K2 map. However, this embodiment of the invention is not limited to this configuration. The change unit 311h may calculate and set the gain K2 on the basis of, for example, a mathematical formula model equivalent to the gain K2 map (the same applies hereinafter).

If it is determined in step ST1 that the brake switch is OFF, namely, that the vehicle 2 is not being braked (step ST1: No), and if it is determined in step ST2 that the current vehicle speed is not equal to or higher than the first predetermined vehicle speed V1 or equal to or lower than the second predetermined vehicle speed V2 (step ST1: No), the EPS control ECU 411 ends the current control cycle, and proceeds to the next control cycle.

Accordingly, the steering device 401 and the EPS control ECU 411 according to this embodiment of the invention control the EPS device 8 to suppress the torque in the road information range in the driving range in which brake vibrations occurs during the braking of the vehicle 2, while making an improvement in driving feeling (steering feeling), thereby making it possible to suppress transmission of vibrations to the steering wheel 4 due to brake vibrations. Then, even during the braking of the vehicle 2, in the driving range in which brake vibrations do not occur, the steering device 401 and the EPS control ECU 411 can transmit the torque in the road information range. As a result, during braking, the steering device 401 and the EPS control ECU 411 can limit the scene in which translation to the steering wheel 4 due to brake vibrations is suppressed, and reduce the suppression of the conveyance of road information to a minimum required level, and therefore can make a further improvement in driving feeling.

The foregoing description is described that the EPS control ECU 411 changes the gain K2 of the first amplifier 211b to make a change in the filter characteristic of the EPS control ECU 411, but the invention is not limited to this configuration. The EPS control ECU 411 may be configured to change, for example, the gain K3 of the second amplifier 211g and the respective filter characteristics of the first filter 211e and the second filter 211f, thereby making a change in the filter characteristic of the EPS control ECU 411.

[Fifth Embodiment]

Figure 18:
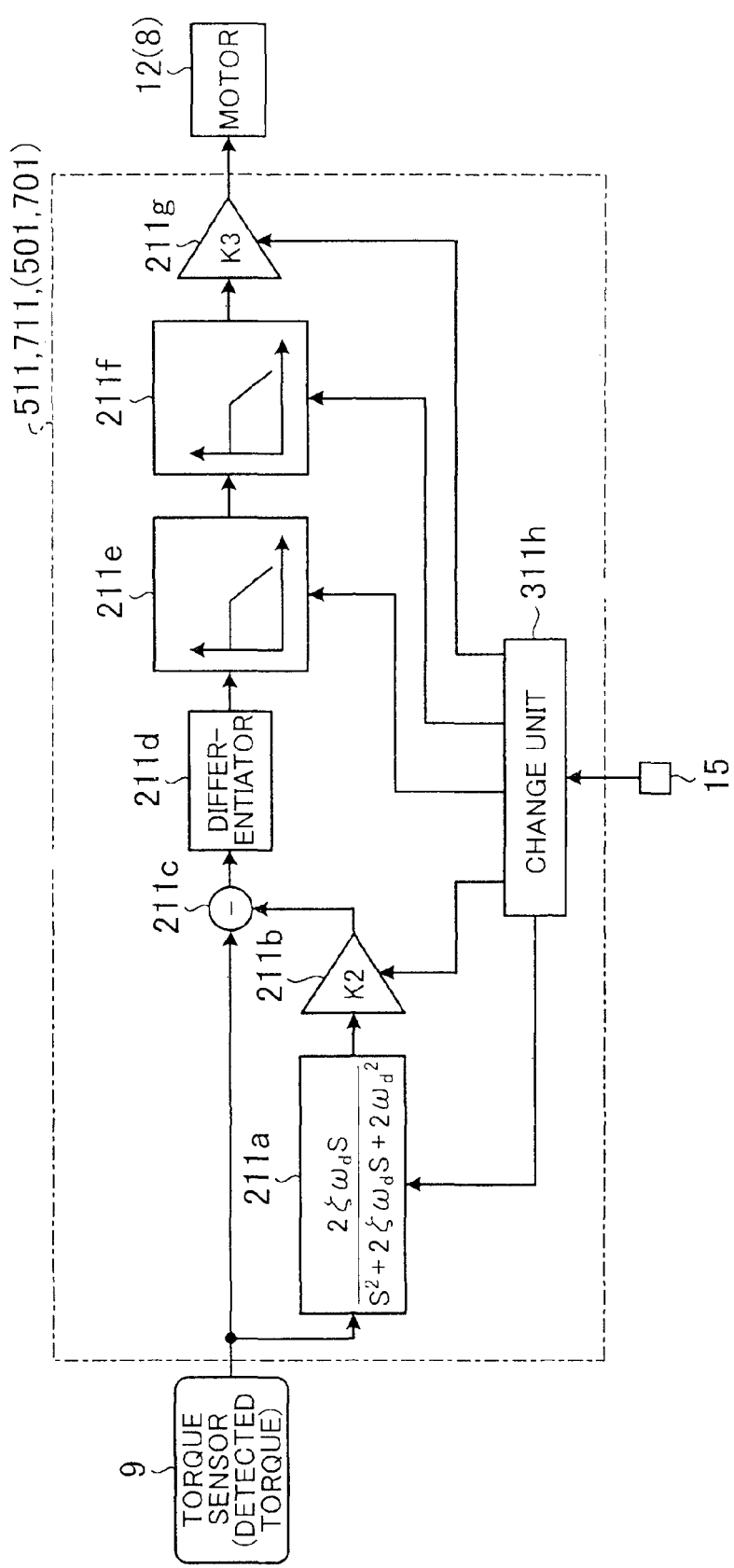
FIG. 18 is a block diagram showing an example of a general configuration of an EPS control ECU according to the fifth embodiment of the invention.
Figure 19:
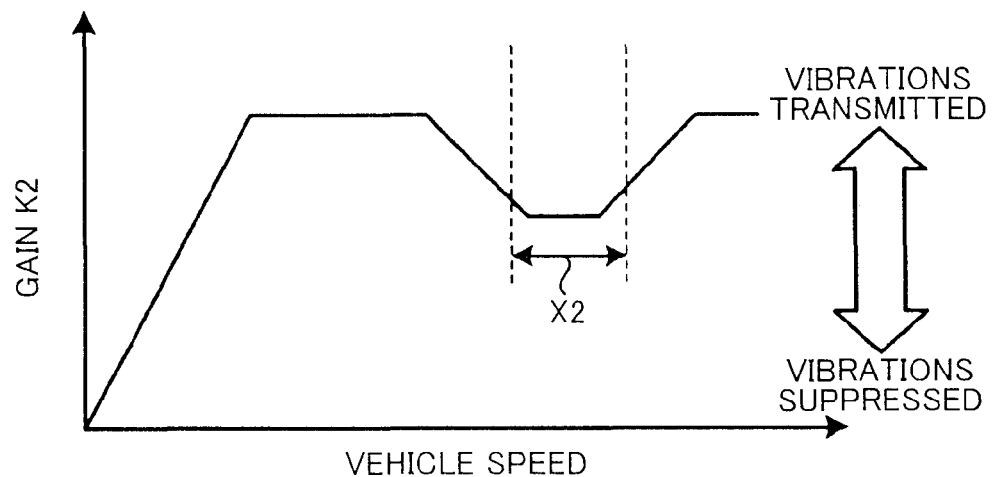
FIG. 19 is a diagram illustrating an example of the setting of a gain by the EPS control ECU according to the fifth embodiment of the invention.
Figure 20:
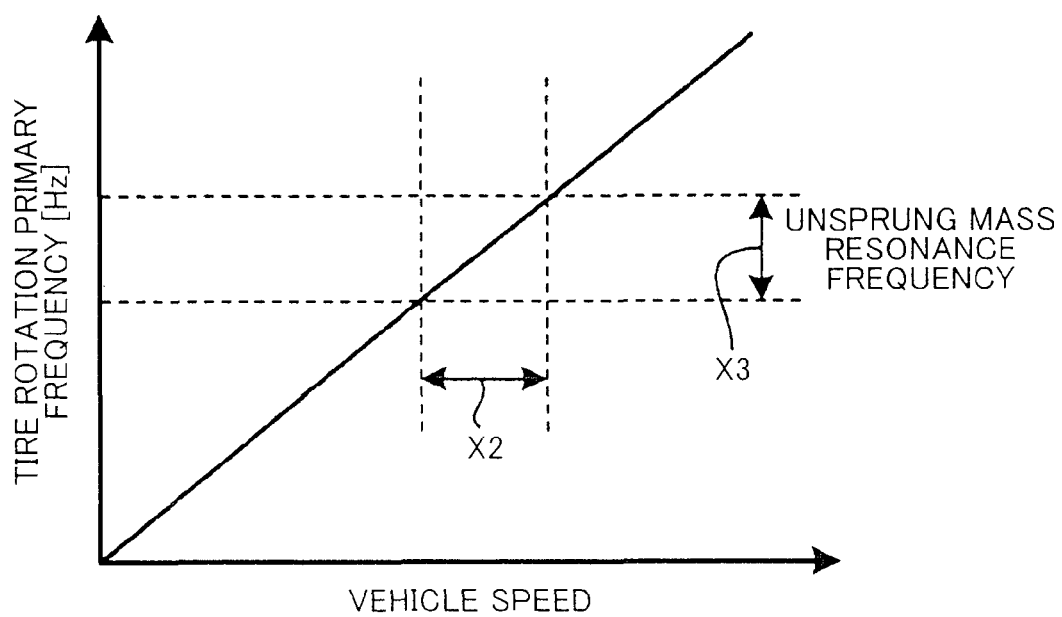
FIG. 20 is a diagram illustrating a flutter that is likely to occur in a vehicle.

FIG. 18 is a block diagram showing an example of a general configuration of an EPS control ECU according to the fifth embodiment of the invention. FIG. 19 is a diagram illustrating an example of the setting of a gain by the EPS control ECU according to the fifth embodiment of the invention. FIG. 20 is a diagram illustrating a flutter that is likely to occur in a vehicle. The steering device and the steering control device according to the fifth embodiment of the invention are different from those of the third and fourth embodiments of the invention in that the transmission of torque is suppressed in accordance with the vehicle speed.

An EPS control ECU 511 serving as a steering control device, which is included in a steering device 501 according to this embodiment of the invention shown in FIG. 18, controls the EPS device 8 to suppress the torque in the road information range (the frequency band in the first predetermined range) if the vehicle speed of the vehicle 2 falls within the second predetermined vehicle speed range. In this case, the EPS control ECU 511 performs the control to suppress the torque in the road information range by changing the filter characteristic on the basis of the vehicle speed as the running speed of the vehicle 2, regardless of the braking state of the vehicle 2.

It should be noted herein that if the steering device 501 controls the EPS device 8 such that the torque in the road information range is transmitted to the steering wheel 4, the amount of vibrations transmitted to the steering wheel 4 due to vibrations at the time of so-called stationary steering of the steering wheel 4, or the amount of vibrations transmitted to the steering wheel 4 due to a so-called flutter may increase. It should be noted herein that stationary steering of the steering wheel 4 is an operation of performing steering operation with the wheels of the vehicle 2 hardly turned so as to turn the steered wheels 3. Besides, a flutter is a phenomenon that occurs as vibrations in the circumferential direction of the steering wheel 4.

On the other hand, the EPS control ECU 511 according to this embodiment of the invention adjusts the filter characteristic of the EPS control ECU 511 to a characteristic having a vibration suppression function (vibration suppression characteristic) during stop of the vehicle 2 or in the vehicle speed range in which a flutter is caused.

The change unit 311h according to this embodiment of the invention controls the EPS device 8 to suppress the torque in the road information range if the vehicle speed falls within the second predetermined vehicle speed range. It should be noted herein that the second predetermined vehicle speed range is set in advance in accordance with, for example, a vehicle speed range in which the steering wheel 4 is likely to be steered in a stationary manner in the vehicle 2, or a vehicle speed range in which a flutter is likely to occur in the vehicle 2. In this case, the second predetermined vehicle speed range is set in advance in accordance with both the vehicle speed range in which stationary steering is likely to be carried out and the vehicle speed range in which a flutter is likely to occur.

The vehicle speed sensor 15 is electrically connected to this change unit 311h, and a detection signal about the vehicle speed of the vehicle 2 is input from the vehicle speed sensor 15 to the change unit 311h. In this case, the brake sensor 14 (see FIG. 15), the longitudinal acceleration sensor 16 (see FIG. 15) or the like may not be electrically connected to the change unit 311h. The change unit 311h controls the EPS device 8 to suppress the torque in the road information range if the vehicle speed of the vehicle 2 falls within the second predetermined vehicle speed range, on the basis of a detection signal about the vehicle speed of the vehicle 2 that has been input from the vehicle speed sensor 15. In this case, this change unit 311h adjusts, on the basis of a detection signal from the vehicle speed sensor 15, the filter characteristic in accordance with the vehicle speed of the vehicle 2. For example, the change unit 311h changes at least one of the respective gains of the first amplifier 211b and the second amplifier 211g and the respective filter characteristics (pass bands and cutoff frequencies) of the BPF 211a, the first filter 211e, and the second filter 211f to change the road information range torque transmission characteristic, thereby suppressing transmission of the torque in the road information range via the shaft 5.

The change unit 311h changes the filter characteristic of the EPS control ECU 511 by, for example, adjusting the gain K2 of the first amplifier 211b in accordance with the vehicle speed of the vehicle 2. The change unit 311h calculates the gain K2 from the vehicle speed of the vehicle 2, and sets the gain K2 of the first amplifier 211b, on the basis of, for example, a gain K2 map exemplified in FIG. 19. In the gain K2 map of FIG. 19, the axis of abscissa represents the vehicle speed, and the axis of ordinate represents the gain K2. The gain K2 map describes a relationship between the vehicle speed and the gain K2. The relationship between the vehicle speed and the gain K2 is set in advance in view of an evaluation of the actual vehicle or the like. The gain K2 map is stored in the storage unit of the EPS control ECU 511. In this gain K2 map, the gain K2 is set so as to become relatively small in the second predetermined vehicle speed range, namely, a low vehicle speed range in which stationary steering is likely to be carried out (a range in which the vehicle speed is in the vicinity of 0), and in the range X2 in which a flutter is likely to occur. The change unit 311h calculates the gain K2 of the first amplifier 211b from the input vehicle speed, on the basis of this gain K2 map.

As a result, the change unit 311h makes the gain K2 of the first amplifier 211b relatively small in the second predetermined vehicle speed range, namely, the low vehicle speed range in which stationary steering is likely to be carried out, and in the range X2 in which a flutter is likely to occur, on the basis of the gain K2 map, whereby the EPS control ECU 511 can suppress transmission of the torque in the road information range to the steering wheel 4.

Accordingly, the steering device 501 and the EPS control ECU 511 according to this embodiment of the invention control the EPS device 8 to suppress the torque in the road information range in accordance with the vehicle speed of the vehicle 2, while making an improvement in driving feeling (steering feeling), thereby making it possible to suppress transmission of vibrations to the steering wheel 4 due to vibrations at the time of stationary steering of the steering wheel 4, and to suppress transmission of vibrations to the steering wheel 4 due to a flutter.

When the steering wheel 4 is steered in a stationary manner, the speed and axial tension of steering operation by the driver are high, and thus the load applied to the motor 12 is relatively high. Accordingly, in the steering device 501, abnormal noise and vibrations tend to occur. In this case, abnormal noise and vibrations occurring in the steering device 501 can be suppressed by changing the filter characteristic of the EPS control ECU 511 to the vibration suppression characteristic as described above. Besides, in principle, a flutter tends to occur in a range X3 in which the primary frequency of rotation of the tires and the unsprung mass resonance frequency are close to each other with the tires of the vehicle 2 unbalanced, as exemplified in FIG. 20. Since the primary frequency of rotation of the tires is proportional to the vehicle speed, the steering device 501 changes the filter characteristic of the EPS control ECU 511 to the vibration suppression characteristic in the range X2 in which a flutter is likely to occur, thereby making it possible to suppress transmission of vibrations to the steering wheel 4 due to a flutter. As a result, the steering device 501 and the EPS control ECU 511 can suppress transmission of unnecessary vibrations to the steering wheel 4, and can make a further improvement in driving feeling.

The EPS control ECU 511 may be configured to change the filter characteristic of the EPS control ECU 511 by changing the gain K3 of the second amplifier 211g and the respective filter characteristics of the first filter 211e and the second filter 211f instead of the gain K2 of the first amplifier 211b, in accordance with, for example, the vehicle speed of the vehicle 2.

[Sixth Embodiment]

Figure 21:
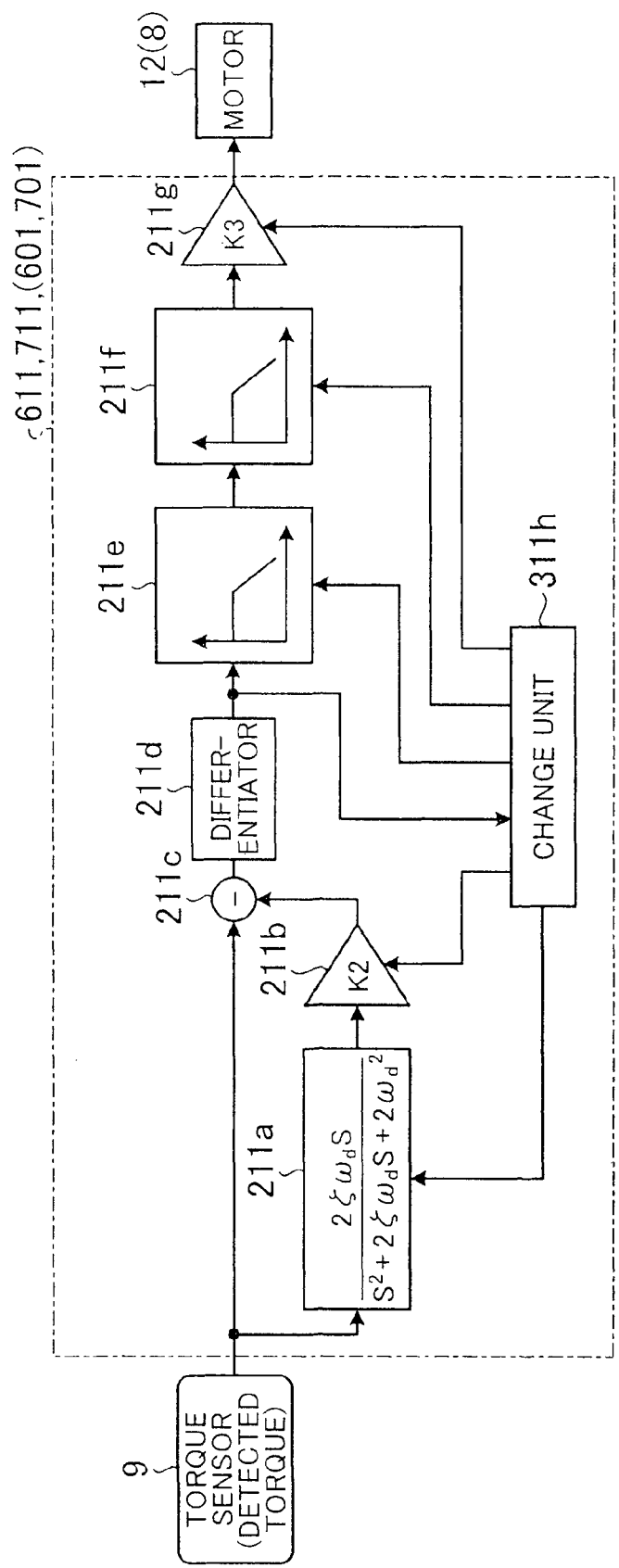
FIG. 21 is a block diagram showing an example of a general configuration of an EPS control ECU according to the sixth embodiment of the invention.
Figure 22:
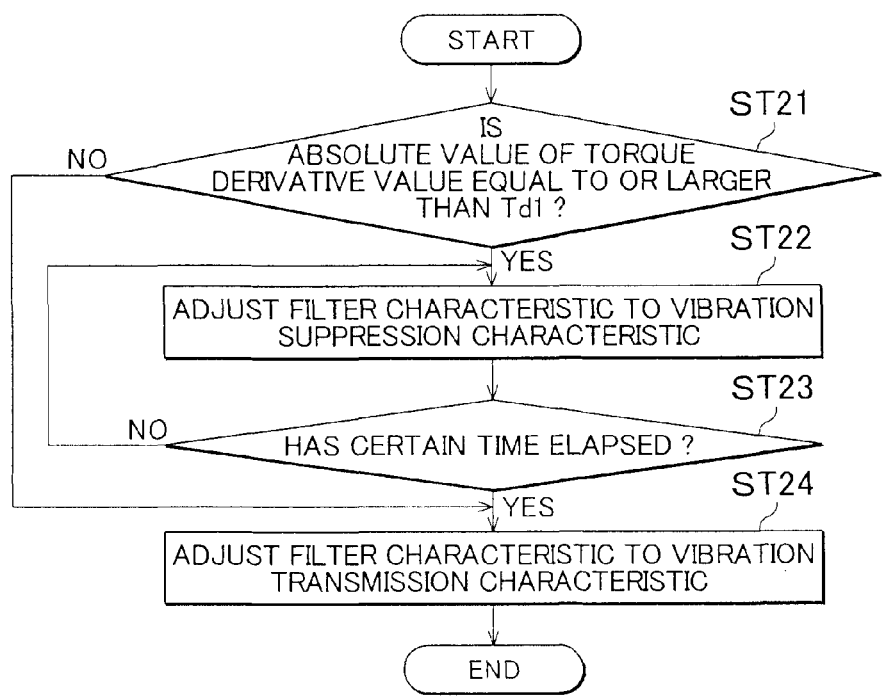
FIG. 22 is a flowchart illustrating an example of control by the EPS control ECU according to the sixth embodiment of the invention.
Figure 23:
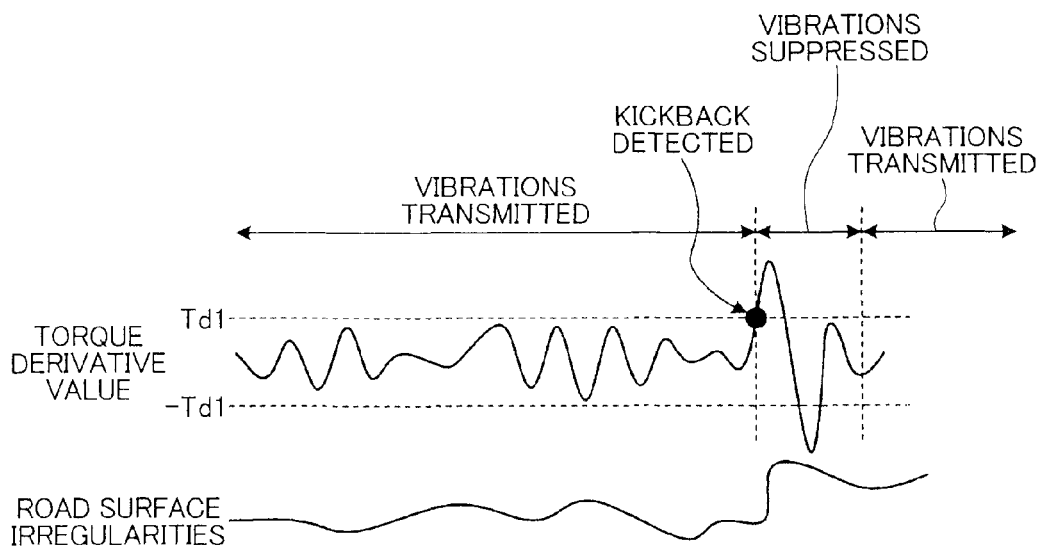
FIG. 23 is a diagram illustrating detection of a kickback in a steering device according to the sixth embodiment of the invention.

FIG. 21 is a block diagram showing an example of a general configuration of an EPS control ECU according to the sixth embodiment of the invention. FIG. 22 is a flowchart illustrating an example of control by the EPS control ECU according to the sixth embodiment of the invention. FIG. 23 is a diagram illustrating detection of a kickback in a steering device according to the sixth embodiment of the invention. The steering device and the steering control device according to the sixth embodiment of the invention are different from those of the third, fourth and fifth embodiments of the invention in that the transmission of torque is suppressed in accordance with the derivative value of the detected torque.

An EPS control ECU 611 serving as a steering control device, which is included in a steering device 601 according to this embodiment of the invention shown in FIG. 21, controls the EPS device 8 to suppress the torque in the road information range (the frequency band in the first predetermined range) for a predetermined period set in advance if the absolute value of the derivative value of the detected torque is equal to or larger than a predetermined value. In this case, the EPS control ECU 611 performs the control to suppress the torque in the road information range by changing the filter characteristic, on the basis of the absolute value of the derivative value of the detected torque. More specifically, the EPS control ECU 611 detects a great impact such as a so-called kickback or the like on the basis of the absolute value of the derivative value of the detected torque, and changes the filter characteristic of the EPS control ECU 611.

It should be noted herein that a kickback is an impact caused to the steering wheel 4 due to the transmission of fluctuations in the state of contact between the road surface and the steered wheels 3 to the steering wheel 4, and is typically an acute and strong impact in the circumferential direction of the steering wheel, which is transmitted to the steering wheel 4 as a result of the irregularities of the road surface, bumps, obstacles such as stones and the like.

It should be noted herein that if the steering device 601 controls the EPS device 8 such that the torque in the road information range is transmitted to the steering wheel 4, the amount of the transmission of vibrations to the steering wheel 4 due to, for example, a great impact such as a kickback or the like may increase.

On the other hand, upon detecting a great impact such as a kickback or the like on the basis of the absolute value of the derivative value of the detected torque, the EPS control ECU 611 according to this embodiment of the invention adjusts the filter characteristic of the EPS control ECU 611 to the characteristic having the vibration suppression function (vibration suppression characteristic) for a predetermined period set in advance.

The kickback as described above tends to exhibit a very large amount of change in the transmitted torque per unit time. Besides, since the kickback is input alone due to the bumps in the road surface or the like, the duration time thereof tends to be very short.

In view of the foregoing tendency, the change unit 311h according to this embodiment of the invention controls the EPS device 8 to suppress the torque in the road information range for a predetermined period set in advance, if the absolute value of the derivative value of the detected torque (the amount of change in torque per unit time) is equal to or larger than a predetermined value. It should be noted herein that the predetermined value and the predetermined period are set in advance in accordance with, for example, a kickback that is likely to occur in the vehicle 2.

The differentiator 211d is electrically connected to this change unit 311h, and a signal corresponding to the derivative value of the detected torque is input from the differentiator 211d to the change unit 311h. In this case, the brake sensor 14 (see FIG. 15), the vehicle speed sensor 15 (see FIG. 15), the longitudinal acceleration sensor 16 (see FIG. 15) and the like may not be electrically connected to the change unit 311h. The change unit 311h controls, on the basis of the derivative value of the detected torque input from the differentiator 211d, the EPS device 8 to suppress the torque in the road information range for a predetermined period, if the absolute value of the derivative value of the detected torque is equal to or larger than the predetermined value. In this case, this change unit 311h adjusts the filter characteristic in accordance with the absolute value of the derivative value of the detected torque, on the basis of a signal from the differentiator 211d. For example, the change unit 311h changes at least one of the respective gains of the first amplifier 211b and the second amplifier 211g and the respective filter characteristics (pass bands and cutoff frequencies) of the BPF 211a, the first filter 211e, and the second filter 211f to change the road information range torque transmission characteristic, thereby restraining the torque in the road information range from being transmitted via the shaft 5.

The change unit 311h changes the filter characteristic of the EPS control ECU 611 by, for example, adjusting the gain K2 of the first amplifier 211b if the absolute value of the derivative value of the detected torque is equal to or larger than a predetermined value. As a result, the change unit 311h makes the gain K2 of the first amplifier 211b relatively small if the absolute value of the derivative value of the detected torque is equal to or larger than the predetermined value, namely, if a kickback is detected. Thus, the EPS control ECU 611 can suppress transmission of the torque in the road information range to the steering wheel 4 for a predetermined period.

Next, an example of the control by the EPS control ECU 611 will be described with reference to the flowchart of FIG. 22.

First of all, the EPS control ECU 611 determines, on the basis of a signal from the differentiator 211*d*, whether or not the absolute value of the derivative value of the detected torque (the torque derivative value) is equal to or larger than a predetermined value Td1 (step ST21).

If it is determined that the absolute value of the derivative value of the detected torque is equal to or larger than the predetermined value Td1 (step ST21: Yes), the EPS control ECU 611 adjusts the filter characteristic of the EPS control ECU 611 to the vibration suppression characteristic (e.g., a characteristic in which the gain K2 is relatively small) (step ST22).

Then, the EPS control ECU 611 determines whether or not a certain time (a predetermined period) has elapsed after determining that the absolute value of the derivative value of the detected torque is equal to or larger than the predetermined value Td1 (step ST23).

If it is determined that the certain time has elapsed (step ST23: Yes), the EPS control ECU 611 adjusts the filter characteristic of the EPS control ECU 611 to the characteristic having the vibration transmission function (vibration transmission characteristic) (e.g., a characteristic in which the gain K2 is relatively large) (step ST24). Then, the EPS control ECU 611 ends the current control cycle, and proceeds to the next control cycle.

If it is determined in step ST21 that the absolute value of the derivative value of the detected torque is smaller than the predetermined value Td1 (step ST21: No), the EPS control ECU 611 proceeds to the process of step ST24.

If it is determined in step ST23 that the certain time has not elapsed (step ST23: No), the EPS control ECU 611 returns to the process of step ST22, and repeatedly performs the following processes.

Accordingly, the steering device 601 and the EPS control ECU 611 according to this embodiment of the invention can detect a kickback on the basis of the absolute value of the derivative value of the detected torque, while making an improvement in driving feeling (steering feeling). Then, as exemplified in FIG. 23, upon detecting a kickback, the steering device 601 and the EPS control ECU 611 change the filter characteristic of the EPS control ECU 611 from the vibration transmission characteristic to the vibration suppression characteristic, and control the EPS device 8 to suppress the torque in the road information range for a predetermined period. Thus, the steering device 601 and the EPS control ECU 611 can suppress transmission of a great impact to the steering wheel 4. Then, after the lapse of the predetermined period, the steering device 601 and the EPS control ECU 611 change the filter characteristic of the EPS control ECU 611 again from the vibration suppression characteristic to the vibration transmission characteristic, and make a change to the control in which the torque in the road information range is not suppressed (the torque in the road information range is permitted to transmit), thereby making it possible to convey road information to the driver. As a result, the steering device 601 and the EPS control ECU 611 can suppress transmission of unnecessary vibrations of a kickback or the like to the steering wheel 4, and can make a further improvement in driving feeling.

The EPS control ECU 611 may be configured to change the filter characteristic of the EPS control ECU 611 by changing the gain K3 of the second amplifier 211*g* and the respective filter characteristics (cutoff frequencies) of the first filter 211*e* and the second filter 211*f* instead of the gain K2 of the first amplifier 211*b*, on the basis of, for example, the absolute value of the derivative value of the detected torque.

[Seventh Embodiment]

Figure 24:
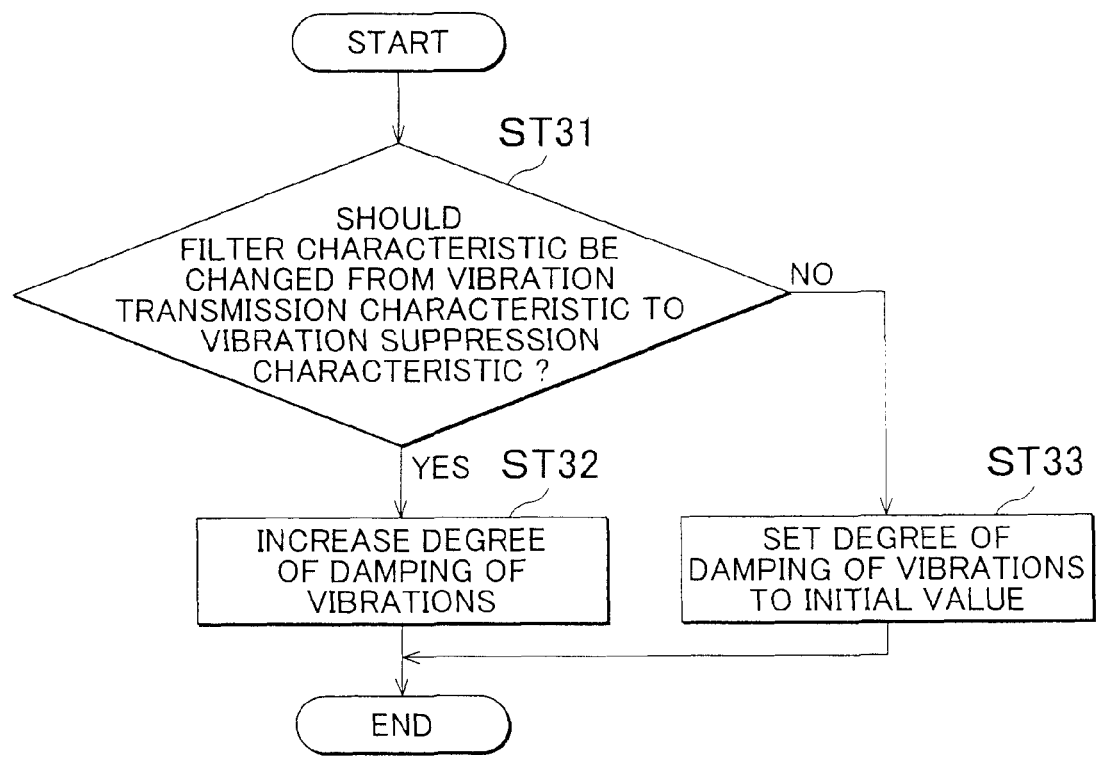
FIG. 24 is a flowchart illustrating an example of control by an EPS control ECU according to the seventh embodiment of the invention.

FIG. 24 is a flowchart illustrating an example of the control by an EPS control ECU according to the seventh embodiment of the invention. The steering device and the steering control device according to the seventh embodiment of the invention are different from those of the third, fourth, fifth and sixth embodiments of the invention in that an actuator is controlled such that vibration damping (damping of vibrations) increases when the transmission of torque is suppressed. Incidentally, as for the respective configurations of the steering device and the steering control device according to the seventh embodiment of the invention, FIG. 1, FIG. 12, FIG. 14, FIG. 15, FIG. 18, FIG. 21, and the like will be referred to when appropriate (the same applies hereinafter).

An EPS control ECU 711 serving as a steering control device, which is included in a steering device 701 according to this embodiment of the invention, controls the EPS device 8 such that the vibration damping increases (the vibration damping performance is enhanced) when a change is made from the control in which the torque in the road information range is not suppressed (the torque in the road information range is permitted to transmit) to the control in which the torque in the road information range is suppressed, as described in relation to the steering device 301 (see FIG. 12), the steering device 301A (see FIG. 14), the steering device 401 (see FIG. 15), the steering device 501 (see FIG. 18), and the steering device 601 (see FIG. 21). That is, the EPS control ECU 711 changes, for example, the damping control gain as well in changing the filter characteristic of the EPS control ECU 611 from the characteristic having the vibration transmission function (vibration transmission characteristic) to the characteristic having the vibration suppression function (vibration suppression function), and controls the EPS device 8 such that the vibration damping increases.

It should be noted herein that the EPS device 8 is generally configured as a spring-mass system, and is inclined such that the vibrations thereof may hardly be damped. Thus, in some cases, the EPS control ECU 711 performs damping control for damping vibrations in accordance with the rotational speed of the motor 12. By performing this damping control, the EPS control ECU 711 makes it possible to, for example, ensure the astringency of the steering wheel 4 and impart a response at the time of steering. In addition, damping control basically has the function of damping vibrations, and therefore can also exert an effect in suppressing vibrations. On the other hand, if the EPS control ECU 711, for example, makes the gain K3 of the first amplifier 211*g* too large in order to suppressing vibrations, the gain becomes large in the steering range, the response of steering becomes too light after a change in torque transmission characteristic, and a feeling of discomfort may be caused to the driver. Besides, if the EPS control ECU 711 further makes the gain K3 too large, the phase advances too much, inverts, and becomes unstable, which may constitute a cause of self-excited vibrations.

On the other hand, in making a change from the control in which the torque in the road information range is not suppressed to the control in which the torque in the road information range is suppressed, the EPS control ECU 711 according to this embodiment of the invention increases the damping control gain, thereby controlling the EPS device 8 such that the vibration damping increases.

Next, an example of control by the EPS control ECU 711 will be described with reference to the flowchart of FIG. 24.

First of all, the EPS control ECU 711 determines whether or not the filter characteristic of the EPS control ECU 711 should be changed from the vibration transmission characteristic to the vibration suppression characteristic (step ST31).

If it is determined that the filter characteristic should be changed from the vibration transmission characteristic to the vibration suppression characteristic (step ST31: Yes), the EPS control ECU 711 increases the damping control gain, thereby controls the EPS device 8 such that the vibration damping increases (step ST32). Then, the EPS control ECU 711 ends the current control cycle, and proceeds to the next control cycle.

If it is determined that the filter characteristic should not be changed from the vibration transmission characteristic to the vibration suppression characteristic (step ST31: No), the EPS control ECU 711 sets the damping control gain to a value that is smaller than the value set in step ST32 (e.g., an initial value as a criterion of damping control), controls the EPS device 8 such that a predetermined degree of vibration damping (e.g., an initial value as a criterion of damping control) is obtained (step ST33). Then, the EPS control ECU 711 ends the current control cycle, and proceeds to the next control cycle.

Accordingly, in changing the filter characteristic of the EPS control ECU 711 from the vibration transmission characteristic to the vibration suppression characteristic, the steering device 701 and the EPS control ECU 711 increase the damping control gain, and control the EPS device 8 such that the vibration damping increases, thereby making it possible to enhance the effect of vibration damping, for example, without making the gain K3 too large. As a result, the steering device 701 and the EPS control ECU 711 can suppress vibrations without deteriorating steering stability and the steering feeling in the steering range, and can make a further improvement in driving feeling.

Incidentally, the steering device and the steering control device according to each of the foregoing embodiments of the invention are not limited to each of the foregoing embodiments of the invention, but can be changed in various manners within the scope described in the claims. The steering device and the steering control device according to this embodiment of the invention may be configured by appropriately combining the components of the respective embodiments of the invention described above with one another.

In the foregoing description, the steering device is presented as a column assist type column EPS device, but is also applicable to, for example, both a pinion assist type and a rack assist type. Besides, the steering device is not limited to an electric power steering device, but is also applicable to a type including a hydraulic power steering device.

In the foregoing description, the steering control device has been described as controlling the actuator such that the torque of the frequency band in the second predetermined range, which corresponds to the detected torque, is not suppressed (the torque of the frequency band in the second predetermined range is permitted to transmit) as well, but is not limited thereto.

The invention claimed is:

1. A steering device comprising:
   a steering member that is provided in a vehicle and configured to be rotationally operated;
   an actuator that generates a torque assisting a steering operation on the steering member;
   a detection device that detects a torque applied to a steering shaft portion that rotates together with the steering member; and
   a steering control device that is configured to perform vibration suppression control to suppress vibrations transmitted to the steering member by adjusting a torque generated by the actuator, on a basis of a detected torque that is a torque detected by the detection device, wherein
   the steering control device is configured to control the actuator such that a torque of a frequency band in a first predetermined range, which corresponds to the detected torque, is not suppressed when performing the vibration suppression control, and
   the frequency band in the first predetermined range is a frequency band that is equal to or higher than 10 Hz and equal to or lower than 40 Hz.

2. The steering device according to claim 1, wherein the steering control device is configured to control the actuator to permit to transmit, via the steering shaft portion, the torque of the frequency band in the first predetermined range, which corresponds to the detected torque.

3. The steering device according to claim 1, wherein the frequency band in the first predetermined range is a frequency band of a torque that is required to be transmitted from a steered wheel of the vehicle to the steering member.

4. The steering device according to claim 1, wherein:
   the steering control device is configured to control the actuator such that a torque of a frequency band in a second predetermined range, which corresponds to the detected torque, is not suppressed; and
   the frequency band in the second predetermined range is a frequency band that is lower than the frequency band in the first predetermined range.

5. The steering device according to claim 4, wherein the frequency band in the second predetermined range is a frequency band of a torque that is required to be transmitted from the steering member to the steered wheel of the vehicle.

6. The steering device according to claim 4, wherein the frequency band in the second predetermined range is a frequency band that is equal to or lower than 5 Hz.

7. The steering device according to claim 4, wherein the steering control device is configured to control the actuator to change a torque transmission characteristic at a time when the torque of the frequency band in the first predetermined range is transmitted via the steering shaft portion and a torque transmission characteristic at a time when the torque of the frequency band in the second predetermined range is transmitted via the steering shaft portion, independently of each other.

8. The steering device according to claim 7, wherein the steering control device is configured to perform a filtering process on the detected torque to calculate a torque to be generated by the actuator, and changes the torque transmission characteristic by changing a filter characteristic in the filtering process.

9. The steering device according to claim 1, wherein, when the vehicle is braked, the steering control device is configured to control the actuator to perform torque suppression control to suppress the torque of the frequency band in the first predetermined range.

10. The steering device according to claim 9, wherein the steering control device is configured to control the actuator to perform the torque suppression control, if at least one of a condition that a vehicle speed of the vehicle falls within a first predetermined vehicle speed range and a condition that an acceleration of the vehicle falls within a first predetermined acceleration range is fulfilled when the vehicle is braked.

11. The steering device according to claim 10, wherein the first predetermined vehicle speed range is set in advance in accordance with a vehicle speed range in which vibrations are likely to occur in the vehicle during braking of the vehicle, and the first predetermined acceleration range are set in advance in accordance with an acceleration range in which vibrations are likely to occur in the vehicle during braking of the vehicle.

12. The steering device according to claim 9, wherein the torque suppression control is control to suppress transmission of the torque of the frequency band in the first predetermined range via the steering shaft portion.

13. The steering device according to claim 9, wherein the steering control device is configured to control the actuator such that vibration damping increases, in performing the torque suppression control.

14. The steering device according to claim 1, wherein the steering control device is configured to control the actuator to perform torque suppression control to suppress the torque of the frequency band in the first predetermined range, if the vehicle speed of the vehicle falls within a second predetermined vehicle speed range.

15. The steering device according to claim 14, wherein the second predetermined vehicle speed range is set in advance in accordance with one of a vehicle speed range in which the steering member is likely to be steered in a stationary manner in the vehicle and a vehicle speed range in which a flutter is likely to occur in the vehicle.

16. The steering device according to claim 1, wherein the steering control device is configured to control the actuator to perform torque suppression control to suppress the torque of the frequency band in the first predetermined range for a predetermined period, if an absolute value of a derivative value of the detected torque is equal to or larger than a predetermined value.

17. The steering device according to claim 16, wherein the predetermined value and the predetermined period are set in advance in accordance with a kickback that is likely to occur in the vehicle.

18. A steering control device comprising:
a control unit configured to control a steering device including: a steering member that is provided in a vehicle and configured to be rotationally operated; an actuator that generates a torque assisting a steering operation on the steering member; a detection device that detects a torque applied to a steering shaft portion that rotates together with the steering member, and to perform vibration suppression control to suppress vibrations transmitted to the steering member by adjusting a torque generated by the actuator, on a basis of a detected torque that is a torque detected by the detection device, wherein
the control unit is configured to control the actuator such that a torque of a frequency band in a predetermined range, which corresponds to the detected torque, is not suppressed when performing the vibration suppression control, and
the frequency band in the predetermined range is a frequency band that is equal to or higher than 10 Hz and equal to or lower than 40 Hz.

19. A control method for a steering device, wherein the steering device includes: a steering member that is provided in a vehicle and configured to be rotationally operated; an actuator that generates a torque assisting steering operation on the steering member; and a detection device that detects a torque applied to a steering shaft portion that rotates together with the steering member, the control method comprising:
performing vibration suppression control to suppress vibrations transmitted to the steering member by adjusting a torque to be generated by the actuator, on a basis of a detected torque that is a torque detected by the detection device; and
controlling the actuator such that a torque of a frequency band in a predetermined range, which corresponds to the detected torque, is not suppressed when performing the vibration suppression control, wherein the frequency band in the predetermined range is a frequency band that is equal to or higher than 10 Hz and equal to or lower than 40 Hz.

* * * * *